(12) United States Patent
Ogura

(10) Patent No.: US 8,259,345 B2
(45) Date of Patent: Sep. 4, 2012

(54) IMAGE PROCESSING APPARATUS, CONTROL METHOD OF IMAGE PROCESSING APPARATUS, PROGRAM, AND STORAGE MEDIUM

(75) Inventor: Keigo Ogura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1409 days.

(21) Appl. No.: 11/473,845

(22) Filed: Jun. 23, 2006

(65) Prior Publication Data

US 2007/0002392 A1  Jan. 4, 2007

(30) Foreign Application Priority Data

Jun. 30, 2005  (JP) ................................. 2005-192015

(51) Int. Cl.
*G06F 15/00* (2006.01)
*G06F 3/12* (2006.01)
*G06K 1/00* (2006.01)
*G06K 15/00* (2006.01)

(52) U.S. Cl. ...... 358/1.9; 358/1.12; 358/1.13; 358/1.14; 358/1.16; 358/1.18

(58) Field of Classification Search ................... 358/1.9, 358/1.12, 1.13, 1.14, 1.15, 1.16, 1.17, 1.18
See application file for complete search history.

(56) References Cited

U.S. PATENT DOCUMENTS

| | | | | |
|---|---|---|---|---|
| 5,195,174 A * | 3/1993 | Kagawa | ........................ | 358/1.2 |
| 5,764,866 A * | 6/1998 | Maniwa | ........................ | 358/1.15 |
| 6,069,707 A * | 5/2000 | Pekelman | ...................... | 358/1.6 |
| 6,226,102 B1 * | 5/2001 | Koike et al. | .................... | 358/1.9 |
| 6,285,460 B1 * | 9/2001 | Koh et al. | ..................... | 358/1.18 |
| 6,512,899 B2 * | 1/2003 | Shimada et al. | ................ | 399/82 |
| 6,657,658 B2 | 12/2003 | Takemura | | |
| 7,002,700 B1 * | 2/2006 | Motamed | ...................... | 358/1.1 |
| 7,006,249 B2 * | 2/2006 | Matsuda | ....................... | 358/1.9 |
| 7,139,102 B2 * | 11/2006 | Minato | ....................... | 358/3.07 |
| 7,145,691 B2 * | 12/2006 | Kato | ............... | 358/1.9 |
| 7,295,335 B2 * | 11/2007 | Arakawa | ...................... | 358/1.15 |
| 7,327,490 B2 | 2/2008 | Kuwata et al. | | |
| 7,523,073 B2 * | 4/2009 | Nomura et al. | ............... | 705/400 |
| 7,529,408 B2 * | 5/2009 | Vohariwatt et al. | .......... | 382/180 |
| 7,599,078 B2 * | 10/2009 | Sano | ............ | 358/1.13 |
| 7,847,990 B2 * | 12/2010 | Kawai | ............ | 358/540 |
| 8,139,256 B2 * | 3/2012 | Motamed | ..................... | 358/1.18 |
| 2002/0122194 A1 | 9/2002 | Kuwata et al. | | |
| 2003/0193598 A1 | 10/2003 | Takemura | | |
| 2005/0068586 A1 * | 3/2005 | Sano | ............ | 358/2.1 |
| 2006/0265242 A1 * | 11/2006 | Kashioka | .......................... | 705/1 |

FOREIGN PATENT DOCUMENTS

| | | |
|---|---|---|
| JP | 10-289060 A | 10/1998 |
| JP | 11-088672 A | 3/1999 |
| JP | 2000-175028 A | 6/2000 |
| JP | 2002-063009 A | 2/2002 |
| JP | 2002-314831 A | 10/2002 |

(Continued)

*Primary Examiner* — Twyler Haskins
*Assistant Examiner* — Jonathan Beckley
(74) *Attorney, Agent, or Firm* — Canon USA Inc IP Division

(57) ABSTRACT

An image processing apparatus retrieves attribute values of image data in a storing unit for storing image data read by a reading unit or image data received from an external unit, and sets the retrieved attribute values as at least a part of read settings for document reading to be performed by the reading unit.

16 Claims, 23 Drawing Sheets

FOREIGN PATENT DOCUMENTS

| | | |
|---|---|---|
| JP | 2003-084941 A | 3/2003 |
| JP | 2003-219075 A | 7/2003 |
| JP | 2003-274148 A | 9/2003 |
| JP | 2004-021347 A | 1/2004 |
| JP | 2005-123814 A | 5/2005 |
| JP | 2005-354162 A | 12/2005 |

* cited by examiner

IMAGE PROCESSING APPARATUS, CONTROL METHOD OF IMAGE PROCESSING APPARATUS, PROGRAM, AND STORAGE MEDIUM

BACKGROUND OF THE INVENTION

1. Field of the Invention

The present invention relates to image processing apparatuses and particularly to a technique that allows easy configuration of settings for document scanning (document reading).

2. Description of the Related Art

Recently, an increasing number of multifunction peripherals (hereinafter referred to as "MFPs") with copying, printing, scanning, facsimile (fax)/network transmission and reception capabilities have a "job combining" (or also called "build job") feature. In the job combining, an MFP combines a plurality of image data sets, document data files, copy jobs, or the like that are stored in a storage (or also called "box") of the MFP (hereinafter collectively referred to as "document data") into a single document, and handles the combined document data as a single job when printing the combined document data or when sending the combined document data via fax or network (see, for example, Japanese Patent Laid-Open No. 2003-84941).

Job combining allows print settings (such as duplex printing and two-in-one printing) of original document data before job combining to be reflected in the entire data after job combining, or clears all settings of original data and allows the configuration of settings of combined data after job combining.

In addition to the job combining that combines a plurality of document data sets stored in a storage (or a box) of an MFP, job combining that combines document data stored in a storage with image data produced by scanning a document is becoming increasingly widespread.

However, when an MFP with a job combining feature scans a document and combines the scanned data with document data already stored in a box, it is difficult and cumbersome for the user to integrate scan settings (such as scan resolution, scan size, and format in which to save a file) for document scanning with settings of the document data that the scanned data is to be combined with.

However, if job combining is performed without integrating these settings, mixed settings in a single document data set can cause inconvenience to the user. For example, if a document saved in a box as a monochrome image by a user with a certain purpose in mind is combined with color image data, the combined document data includes a color image despite the user's original intention. If, for example, a document saved in a box at a low resolution for the purpose of reducing the file size or the like is combined with high-resolution scanned document image data, the file size of the combined document becomes larger the user originally intended. If, for example, document data saved as A4-size data is combined with image data produced by scanning an A3-size document at the same size, pages of different sizes contained in the combined document data may cause problems in printing, particularly in duplex printing and finishing.

Moreover, when digitized image data produced by scanning a document is combined with one or more document data sets originally stored in the box of the MFP and sent via a file transfer protocol, such as service message block (SMB) or file transfer protocol (FTP), or attached to an email message and sent, if a plurality of data sets are simply combined into a file, which is a single document data set, and sent, the data recipient may experience similar problems to those described above.

SUMMARY OF THE INVENTION

The present invention has been made in view of the disadvantages described above, and is directed to providing a technique that allows optimum and easy configuration of scan settings for job combining that combines a scanned document with document data stored in a storage.

According to a first exemplary embodiment of the present invention, an image processing apparatus is provided which includes a reading unit configured to read a document image to create image data; a storing unit configured to store the image data created by the reading unit or image data received from an external unit; a specifying unit configured to specify particular image data stored in the storing unit; and a setting unit configured to retrieve attribute values of the image data specified by the specifying unit, and set the retrieved attribute values as at least a part of read settings for document reading to be performed by the reading unit.

According to an aspect of the embodiment, the reading unit reads a document image according to the read settings set by the setting unit. According to another aspect of the embodiment, the apparatus further includes a displaying unit configured to display the read settings. According to another aspect of the embodiment, the apparatus further includes a modifying unit configured to modify the read settings set by the setting unit.

According to still another aspect of the embodiment, the displaying unit displays user-configurable settings, other than the read settings set by the setting unit, on the displaying unit in an identifiable manner. And according to yet another aspect of the embodiment, the apparatus includes a combining unit configured to combine the image data created by the reading unit with the image data specified by the specifying unit to form combined image data.

Moreover, according to another aspect of the embodiment, the apparatus includes a sending unit configured to send the combined image data formed by the combining unit. Additionally, according to another aspect of the present invention, the image data specified by the specifying unit is overwritten with the combined image data formed by the combining unit and is stored in the storing unit. Also, according to another aspect of the present invention, the storing unit changes the name of the combined image data formed by the combining unit and stores the combined image data separately from the image data specified by the specifying unit.

Furthermore, according to another aspect of the present invention, if setting values of the image data specified by the specifying unit cannot be detected, the displaying unit displays a message indicating that there are no configurable settings to be set by the setting unit. And according to another aspect of the present invention, the apparatus further includes an insertion positioning unit configured to specify a page insertion point in the image data specified by the specifying unit, wherein the combining unit inserts the image data created by the reading unit into the image data specified by the specifying unit at the page insertion point specified by the insertion positioning unit, thereby forming the combined image data.

According to another exemplary embodiment of the present invention, a control method of an image processing apparatus is provided. The method includes a reading step of reading a document image to create image data; a storing step of storing the image data created in the reading step or image data received from an external unit; a specifying step of specify particular image data stored in the storing step; and a setting step of retrieving attribute values of the image data specified in the specifying step, and setting the retrieved attribute values as at least a part of read settings for document reading to be performed in the reading step.

According to another exemplary embodiment of the present invention, a program for executing a control method of an image processing apparatus. The program includes a reading module for reading a document image to create image data; a storing module for storing the image data created by the reading module or image data received from an external unit; a specifying module for specifying particular image data stored by the storing module; and a setting module for retrieving attribute values of the image data specified by the specifying module, and setting the retrieved attribute values as at least a part of read settings for document reading to be performed by the reading module.

And additionally, according to another exemplary embodiment of the present invention, a computer readable storage medium containing computer-executable instructions for executing a control method of an image processing apparatus is provided. The computer readable medium includes computer-executable instructions for reading a document image to create image data; computer-executable instructions for storing the image data created by the reading module or image data received from an external unit; computer-executable instructions for specifying particular image data stored by the storing module; and computer-executable instructions for retrieving attribute values of the image data specified by the specifying module, and setting the retrieved attribute values as at least a part of read settings for document reading to be performed by the reading module.

The configuration of the aforementioned embodiments increases user convenience in configuring settings of document scanning in the process of job combining.

Further features of the present invention will become apparent from the following description of exemplary embodiments with reference to the attached drawings.

DESCRIPTION OF THE PREFERRED EMBODIMENTS

Numerous embodiments, features and aspects of the present invention will now be described with reference to the attached drawings. Components described in the illustrated embodiments are for exemplary purposes only and are not intended to limit the scope of the present invention.

First Exemplary Embodiment

Figure 1:
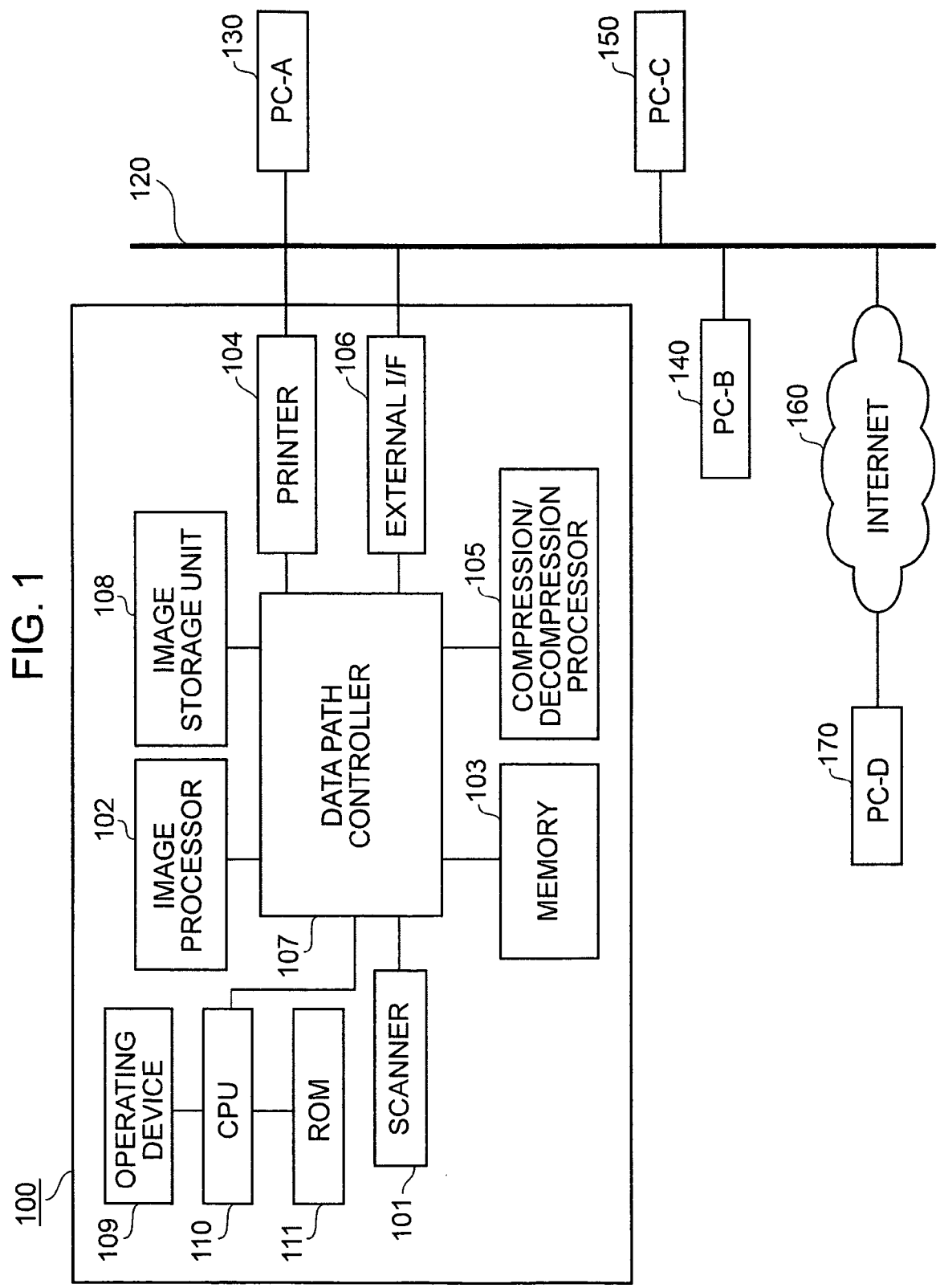
FIG. 1 shows an overall architecture of an exemplary scanning and printing system according to an embodiment of the present invention.

FIG. 1 shows an overall system architecture and configuration according to an exemplary embodiment of the present invention. An MFP-A 100, a PC-A 130, a PC-B 140, and a PC-C 150 are connected to a local area network (LAN) 120. The LAN 120 is connected to the Internet 160, to which a PC-D 170 is connected.

The PC-A 130, PC-B 140, and PC-C 150 that are connected to the LAN 120, and the PC-D 170 connected to the LAN 120 via the Internet 160 are information processing apparatuses represented by personal computers (PCs). These information processing apparatuses are capable of not only sending and receiving various types of data, such as print data and email messages, to and from the MFP-A 100, other PCs, and the like, but also capable of controlling the MFP-A 100.

The PC-D 170 is a PC connected to the LAN 120 via the Internet 160 and is capable of sending and receiving data, email messages, and the like, as necessary, to and from other PCs and the like on the LAN 120.

The MFP-A 100 is an image processing apparatus having the capabilities of copying, fax transmission and reception, network transmission and reception, printing, and scanning. In the MFP-A 100, a scanner 101 optically reads a document using a charge-coupled device (CCD) and converts the scanned document into red, green, and blue (RGB) digital signals by analog-to-digital conversion.

An image processor 102 receives digitized RGB signals from the scanner 101 or the like, performs various image processing operations, such as filtering, color conversion, and scaling, and outputs signals appropriate for the output destination. For a binary color printer, the image processor 102 outputs binary image signals of cyan, magenta, yellow, and black (CMYK). For a multilevel color printer, the image processor 102 outputs multilevel image signals of RGB.

A memory 103 is for storing image data, including RGB image data from the scanner 101 and various types of image data from the image processor 102, and is a memory medium, such as a random-access memory (RAM). For printing multiple copies of a single image data set, image data stored in the memory 103 is read multiple times and outputted. Thus, using the memory 103 eliminates the need for operating the scanner 101 many times and reduces time required for print processing.

A printer 104 performs printing on the basis of image data. Although the printer 104 of the present embodiment is a binary color printer using a four-color (CMYK) ink set, the printer 104 is not limited to this and may be a color printer that supports multilevel output or a monochrome printer. The printing method may either be an electrophotographic printing method or an inkjet recording method. A compression/decompression processor 105 compresses and decompresses RGB multilevel image data or CMYK binary image data.

An image storage unit 108 is capable of storing a plurality of image data sets. The image storage unit 108 is a large-capacity storage medium, such as a hard disk drive (HDD), and can store a large amount of data, which is managed by a central processing unit (CPU) 110 of the MFP-A 100. The image storage unit 108 can form a "box" (described below), in which image data scanned by the scanner 101, and image data, print data, document data or the like received from an external unit via the LAN 120 can be stored. Hereinafter, various types of data, including image data, print data, and document data stored in a box will be collectively referred to as "box document".

An external interface (I/F) 106 serves as an interface that allows the MFP-A 100 to connect to the LAN 120 to input and output various types of image data and control commands via the LAN 120 according to various network protocols. A data path controller 107 sends and receives image data to and from various processing units according to the operation of the MFP-A 100.

Control of various processing units, including the data path controller 107, in various operating modes is performed by the CPU 110 according to instructions from the user through an operating device 109. A program for controlling the MFP-A 100 is stored in a read-only memory (ROM) 111. The CPU 110 loads the program from the ROM 111 into the memory 103 and executes the program.

Figure 9:
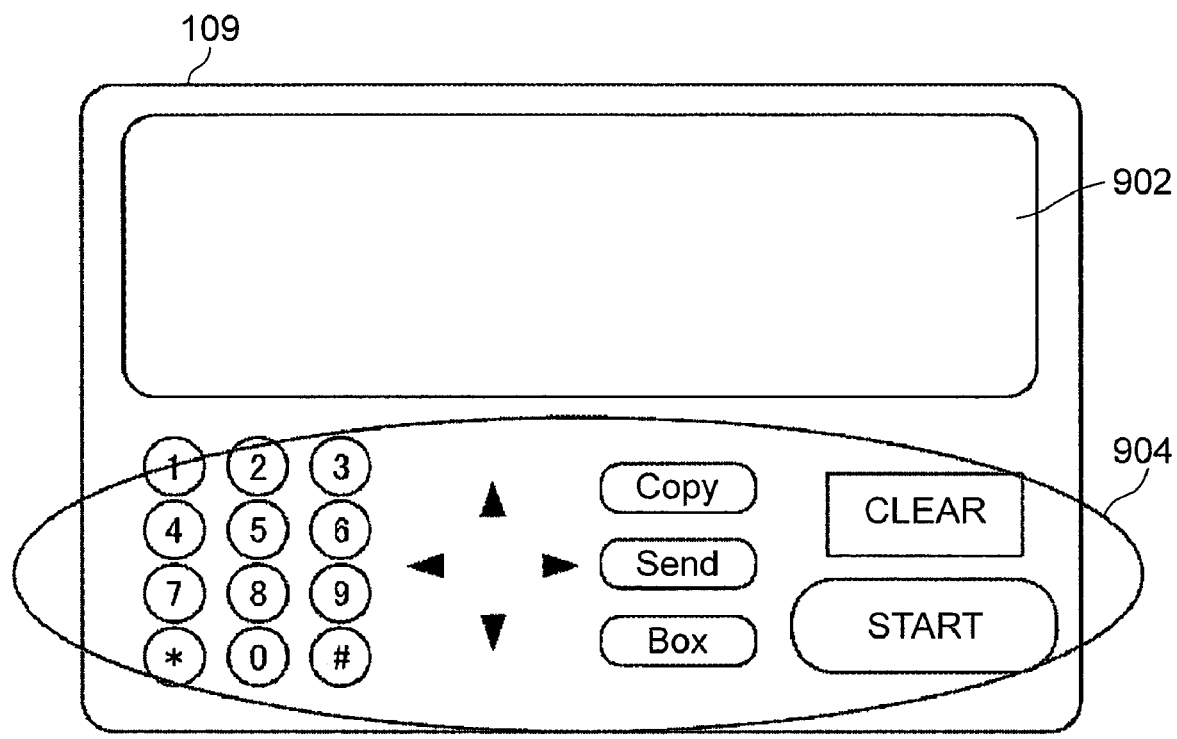
FIG. 9 shows an exemplary operating device of the MFP-A 100.

As shown in FIG. 9, the operating device 109 of the present embodiment includes a display unit 902, such as a touch panel liquid crystal display, and an input unit 904. The input unit 904 includes a numeric keypad used for entering numbers and the like; cursor-movement keys used for moving a cursor displayed on the display unit 902 and for mode selection; mode-setting keys used for selecting a particular operating mode of the MFP-A 100 from a Copy mode, a Send mode, and a Box mode; a start key used for instructing the start of operation; and a clear key for clearing settings.

The user of the MFP-A 100 operates the input unit 904 or the touch panel of the display unit 902 while viewing display on the display unit 902, thereby controlling the MFP-A 100 as desired.

Figure 7:
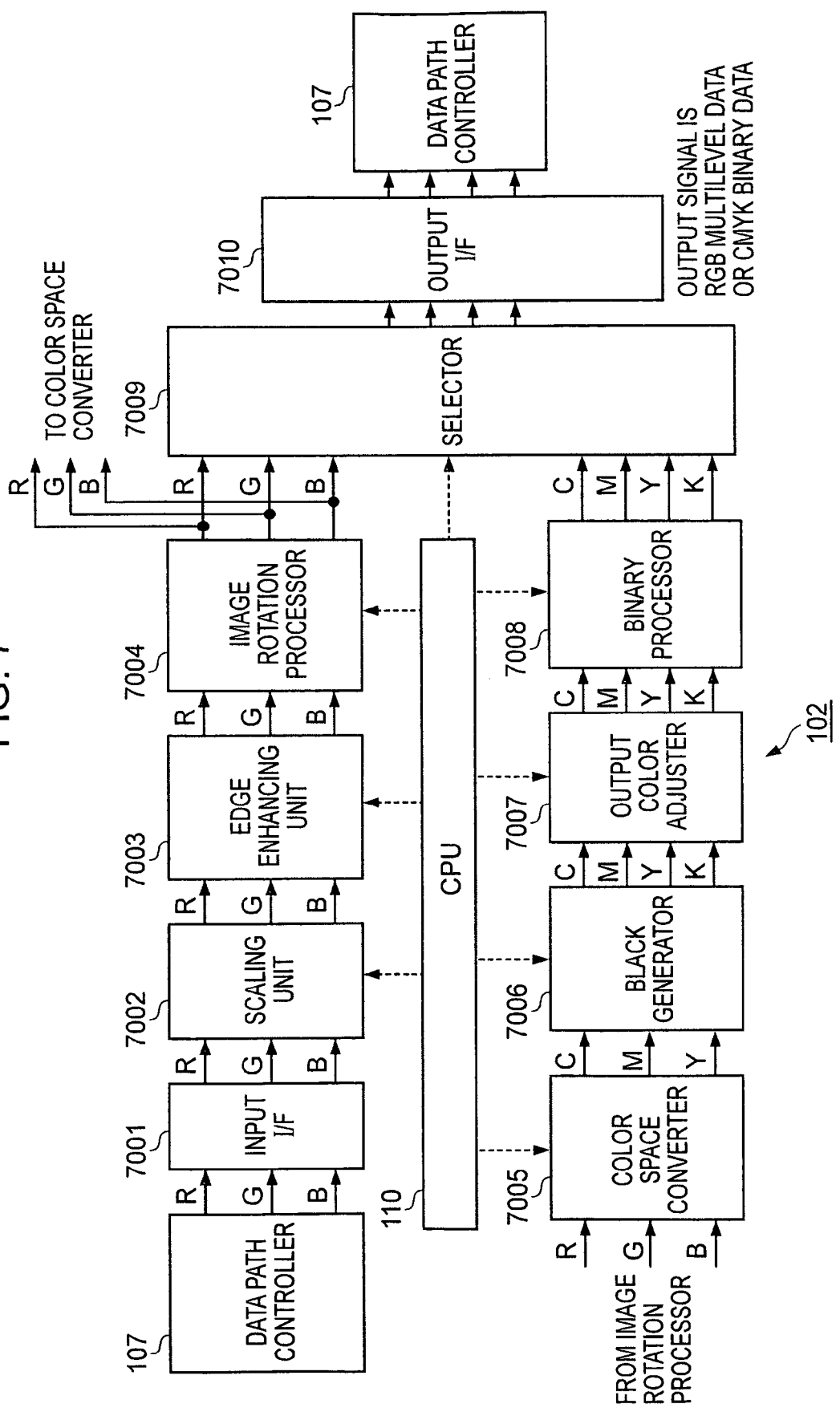
FIG. 7 is a detailed functional block diagram of an exemplary image processor 102 in the MFP-A 100.

The image processor 102 in the MFP-A 100 will now be described in detail. FIG. 7 is a detailed functional block diagram of the image processor 102 of the present embodiment. In particular, FIG. 7 shows an example in which RGB multilevel image data from the scanner 101 is converted to CMYK binary image data and output from the printer 104.

An input I/F 7001 is an interface that receives image data inputted from the data path controller 107 and converts the data according to the type of processing in the image processor 102. In the present embodiment, the input I/F 7001 inputs RGB multilevel image data to a scaling unit 7002. The scaling unit 7002 converts the resolution of the inputted RGB multilevel image data according to the resolution of the printer to be used for output, the size of paper to be outputted, and the like, thereby performing enlargement and reduction processing.

An edge enhancing unit 7003 performs processing for sharpness and smoothing by weighted calculation in an n-by-m area. An image rotation processor 7004 temporarily stores image data in an internal memory and rotates an image, for example, by 90 degrees when image data inputted to fit on output paper in portrait orientation is to be outputted on paper in landscape orientation.

A color space converter 7005 performs processing when it is necessary to convert the color space of inputted image data to a different color space. In the present embodiment, the color space of RGB image data inputted from the scanner 101 is converted, by logarithmic (LOG) conversion, to a CMY color space to be used for printing on the printer 104.

A black generator 7006 extracts the minimum value of CMY as a "K" signal value. An output color adjuster 7007 adjusts CMYK values and color density to the characteristics of the printer. To create data to be outputted from a binary color printer, a binary processor 7008 performs binary conversion using known pseudo-halftoning, such as an error diffusion method, and outputs a one-bit binary signal for each of CMYK.

A selector 7009 selects which of RGB multilevel image data and CMYK binary image data to output. An output I/F 7010, when outputting an image data signal selected by the selector 7009 to the data path controller 107, converts the data format of the image data signal such that the image data signal passes through a data path. In the present embodiment, the output I/F 7010 outputs CMYK binary image data.

The configuration and operation of each of the processing units described above are controlled by control signals from the CPU 110. For example, control signals from the CPU 110 controls the setting of scaling factors in the scaling unit 7002, the filtering coefficient of the edge enhancing unit 7003, whether or not to perform rotation and the angle of rotation performed by the image rotation processor 7004, and the processing method of the binary processor 7008.

Figure 8:
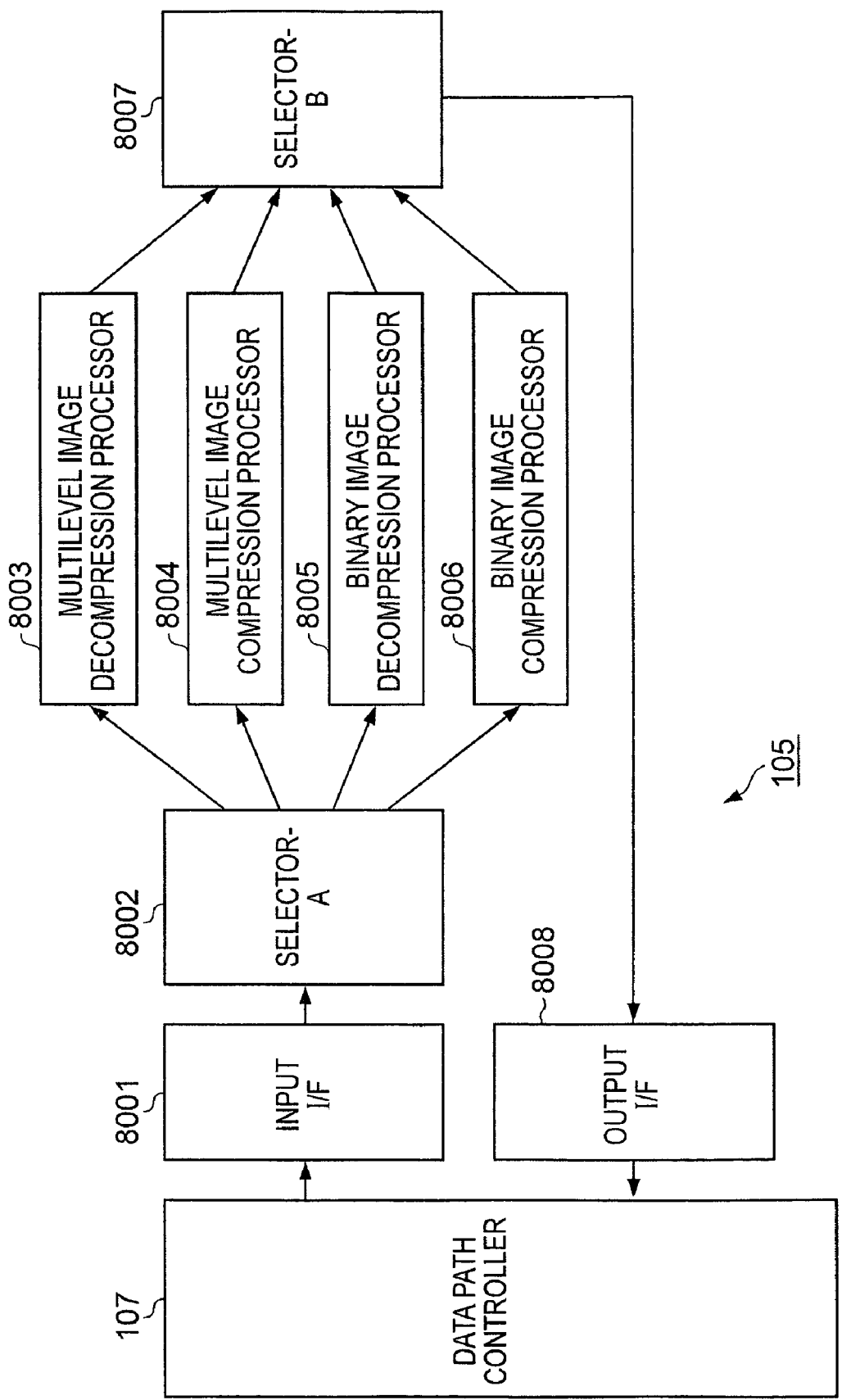
FIG. 8 is a detailed functional block diagram of an exemplary compression/decompression processor 105 in the MFP-A 100.

The compression/decompression processor 105 in the MFP-A 100 will now be described in detail. FIG. 8 is a detailed functional block diagram of an exemplary compression/decompression processor 105 of the present embodiment.

An input I/F 8001 inputs image data from the data path controller 107 to a selector-A 8002. The selector-A 8002 directs incoming data to appropriate processors. Specifically, data produced by compressing multilevel image data is directed to a multilevel image decompression processor 8003, uncompressed multilevel image data is directed to a multilevel image compression processor 8004, data produced by compressing binary image data is directed to a binary image decompression processor 8005, and uncompressed binary image data is directed to a binary image compression processor 8006.

The multilevel image decompression processor 8003 decompresses multilevel image data compressed by data compression. In the present embodiment, the multilevel image decompression processor 8003 performs Joint Photographic Coding Experts Group (JPEG) decompression.

The multilevel image compression processor 8004 compresses uncompressed RGB multilevel image data inputted from the scanner 101. In the present embodiment, the multilevel image compression processor 8004 performs JPEG compression.

The binary image decompression processor 8005 decompresses binary image data compressed by data compression. In the present embodiment, the binary image decompression processor 8005 performs Joint Bi-level Image experts Group (JBIG) decompression.

The binary image compression processor 8006 compresses uncompressed CMYK binary image data processed by the image processor 102 for printing, and inputted. In the present embodiment, the binary image compression processor 8006 performs JBIG compression. In the present embodiment, the JPEG compression technique and the JBIG compression technique are used for multilevel images and binary images, respectively. However, other compression techniques may also be used.

If image data inputted from the input I/F 8001 is compressed multilevel data, a selector-B 8007 selects an input from the multilevel image decompression processor 8003. If image data input from the input I/F 8001 is uncompressed multilevel data, the selector-B 8007 selects an input from the multilevel image compression processor 8004. If image data input from the input I/F 8001 is compressed binary data, the selector-B 8007 selects an input from the binary image decompression processor 8005. If image data input from the input I/F 8001 is uncompressed binary data, the selector-B 8007 selects an input from the binary image compression processor 8006 as image data for output and outputs the input from the binary image compression processor 8006 to an output I/F 8008. The output I/F 8008 outputs image data processed in the compression/decompression processor 105 to the data path controller 107.

Exemplary Operations

Various types of operations in the MFP-A 100 and a flow of image data in the MFP-A 100 during each operation will now be described.

(Exemplary Copy Operation)

Figure 2:
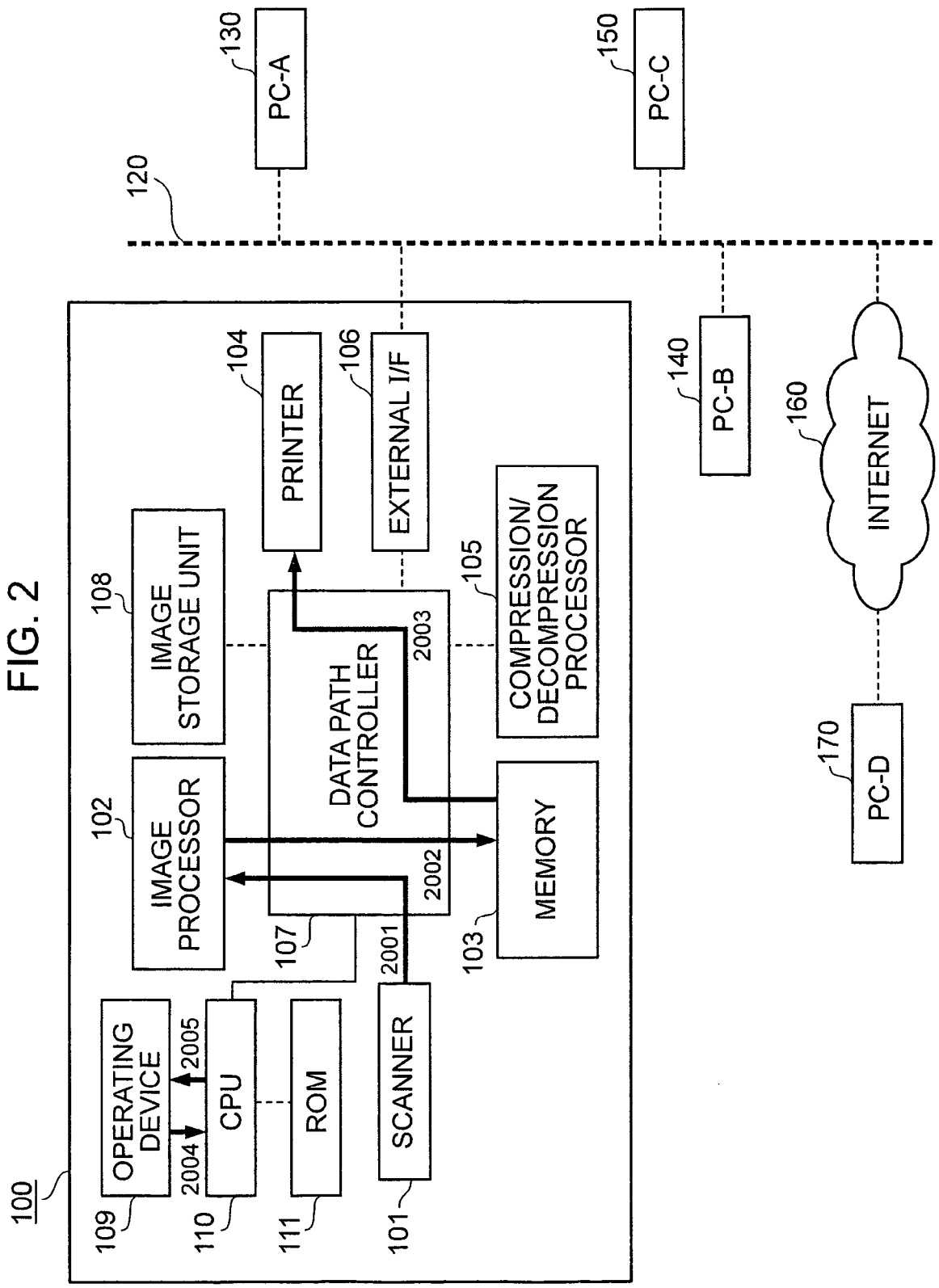
FIG. 2 shows a typical copy operation in an MFP-A 100 of the scanning and printing system.

FIG. 2 shows an exemplary flow of image data in the MFP-A 100 when the MFP-A 100 of the present embodiment performs a copy operation. Parts and components similar to those in FIG. 1 are assigned the same reference numerals.

The user uses the operating device 109 to configure settings, such as the number of copies and the type of document, for copy mode. Upon completion of the configuration of various settings for the copy mode, the user operates the input unit 904 of the operating device 109 to start copying.

Scanning (document scanning operation) performed by the scanner 101 allows document image data to be output as RGB data to the image processor 102, where predetermined image processing according to the settings entered from the operating device 109 is performed. In the present embodiment, the image processor 102 converts the input RGB image data to CMYK binary image data for print output. This flow of image data corresponds to a data path 2001 in FIG. 2.

The image processor 102 performs various types of image processing and outputs CMYK binary print image data to the data path controller 107. The CMYK binary print image data is stored in the memory 103. This flow of image data corresponds to a data path 2002 in FIG. 2. After document image data has all been stored in the memory 103, the CMYK binary print image data is read out of the memory 103, outputted to the printer 104 via the data path controller 107, and printed. This flow of image data corresponds to a data path 2003 in FIG. 2.

When the number of copies is set to two or more, image data for the second and subsequent copies is read out of the memory 103 and printed. This eliminates the need to scan the same document many times for the second and subsequent copies to be printed. When a specified number of copies have been printed, the copy operation is completed.

Settings for the copy operation are entered by the user through the operating device 109 and transferred to the CPU 110. Each processing unit in the MFP-A 100 operates under the control of the CPU 110. Screen messages associated with the user's setting process and the operating status of the MFP-A 100 during the copy operation are displayed on the display unit 902 to the user, according to data transferred from the CPU 110 to the operating device 109. This data exchange corresponds to data paths 2004 and 2005 in FIG. 2.

(Exemplary Scan to Box Operation)

Figure 3:
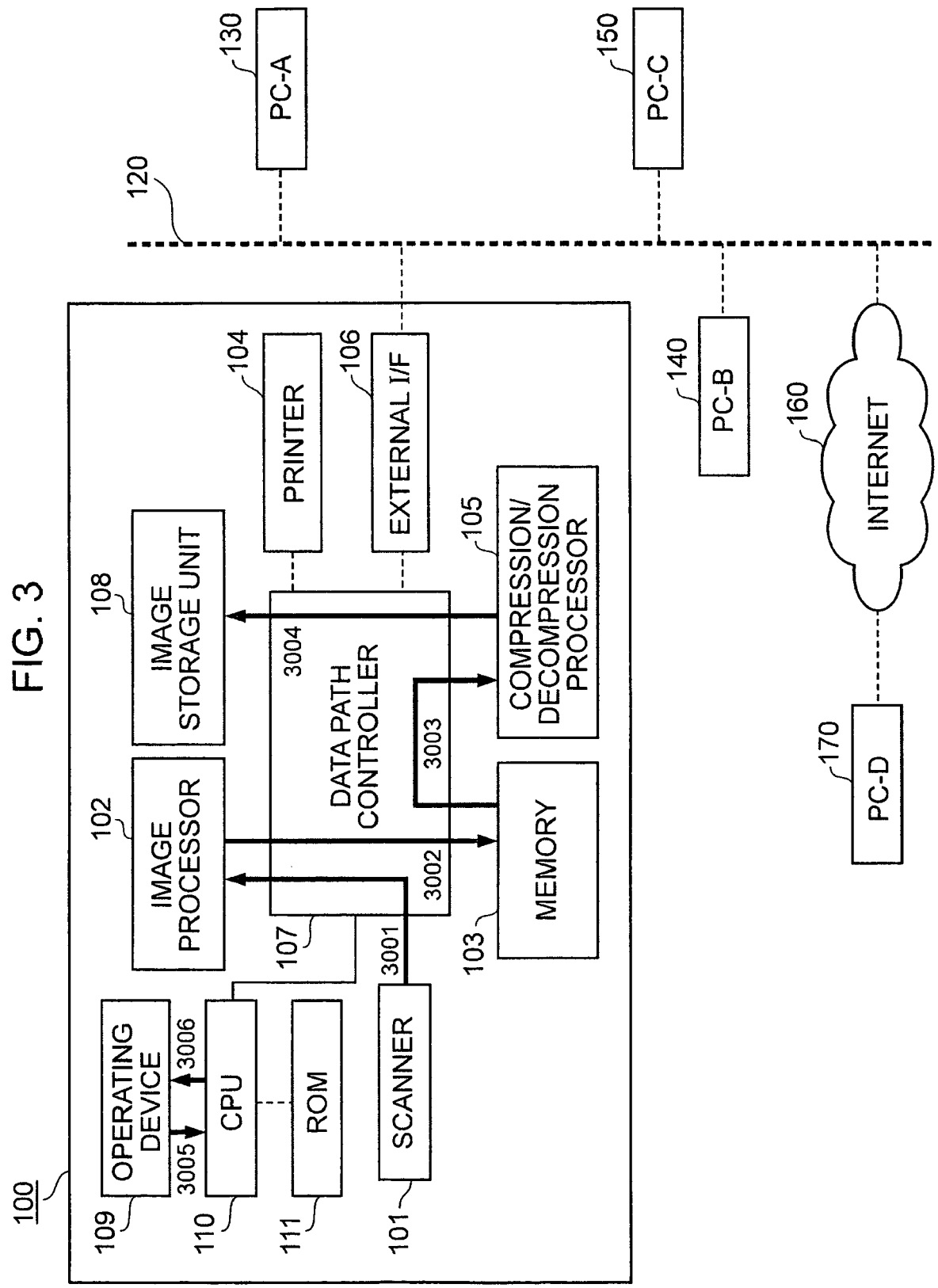
FIG. 3 shows an exemplary operation in which an image scanned by the MFP-A 100 is to be stored in an image storage unit 108.

FIG. 3 shows an exemplary flow of image data in the MFP-A 100 when document image data scanned by the scanner 101 is compressed and stored in the image storage unit 108. This series of operations will hereinafter be referred to as "Scan to Box". Moreover, a function that involves the storing of image data inputted from the scanner 101 or from an external unit into the image storage unit 108, the printing of image data stored in the image storage unit 108, fax transmission, and network transmission is referred to as a box function. In FIG. 3, parts and components similar to those in FIG. 1 are assigned the same reference numerals.

The user uses the operating device 109 to configure settings for image scanning, such as the size and type of document, scanning resolution, and a folder in the image storage unit 108 in which image data is to be stored. Upon completion of the configuration of various settings, the user operates keys of the input unit 904 to start scanning.

Scanning (document scanning operation) performed by the scanner 101 allows document image data to be outputted as RGB data to the image processor 102, where predetermined image processing according to the settings is performed. In the present embodiment, the image processor 102 converts the inputted RGB image data to RGB multilevel image data to be stored in the image storage unit 108. This flow of image data corresponds to a data path 3001 in FIG. 3.

The image processor 102 performs various types of image processing and outputs the RGB multilevel image data, to the data path controller 107, to be stored in the image storage unit 108. The RGB multilevel image data is stored in the memory 103. This flow of image data corresponds to a data path 3002 in FIG. 3.

After document image data has all been stored in the memory 103, the RGB multilevel data is read out of the memory 103 and outputted via the data path controller 107 to the compression/decompression processor 105. This flow of image data corresponds to a data path 3003 in FIG. 3.

Since uncompressed RGB multilevel image data has been inputted, the compression/decompression processor 105 performs JPEG compression processing on the RGB multilevel image data, which is then outputted to the data path controller 107 and stored in a specified folder in the image storage unit 108. This flow of image data corresponds to a data path 3004 in FIG. 3.

Settings for the Scan to Box operation are entered by the user through the operating device 109 and transferred to the CPU 110. Each processing unit in the MFP-A 100 operates under the control of the CPU 110. Screen messages associated with the user's setting process and the operating status of the MFP-A 100 are displayed on the display unit 902 to the user, according to data transferred from the CPU 110 to the operating device 109. This data exchange corresponds to data paths 3004 and 3005 in FIG. 3.

(Exemplary Box Print Operation)

Figure 4:
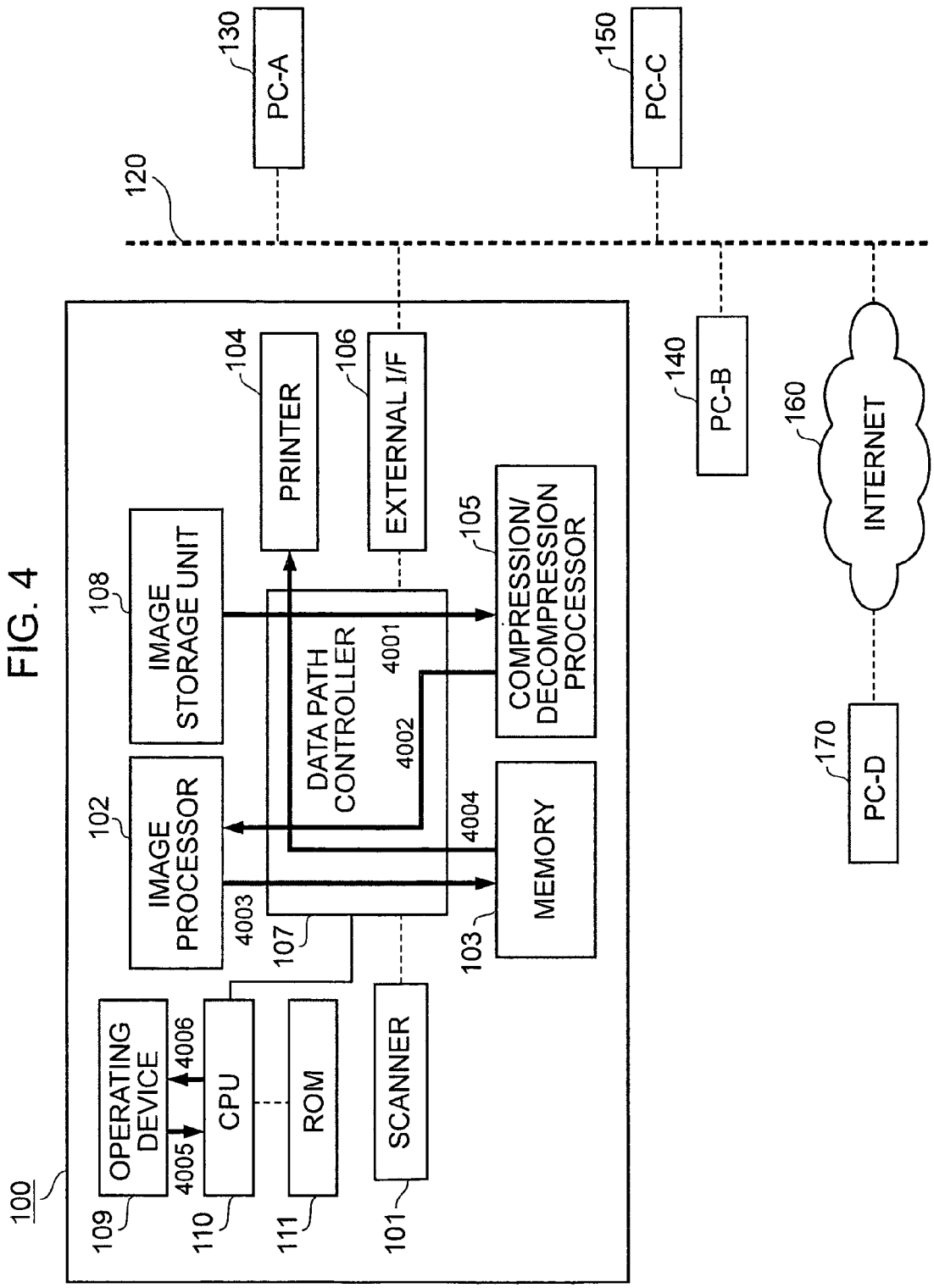
FIG. 4 shows an exemplary operation in which an image stored in the image storage unit 108 of the MFP-A 100 is to be printed.

FIG. 4 shows an exemplary flow of image data in the MFP-A 100 when image data stored in the image storage unit 108 is printed. This operation will hereinafter be referred to as "Box Print". In FIG. 4, parts and components similar to those in FIG. 1 are assigned the same reference numerals.

The user uses the operating device 109 to specify a folder included in the image storage unit 108 and in which image data to be outputted is stored, to specify an image to be outputted, and to configure various settings (e.g., the number of copies to be printed, simplex/duplex printing, and the type of finishing) for printing. Upon completion of the configuration of various settings, the user operates keys of the input unit 904 to start printing.

In response, a specified image data stored in the image storage unit 108 is outputted as JPEG-compressed RGB data, via the data path controller 107, to the compression/decompression processor 105. This flow of image data corresponds to a data path 4001 in FIG. 4.

Since RGB multilevel JPEG-compressed image data has been inputted, the compression/decompression processor 105 performs JPEG decompression processing. The RGB multilevel image data on which the JPEG decompression processing is performed by the compression/decompression processor 105 is outputted to the data path controller 107 and inputted into the image processor 102. This flow of image data corresponds to a data path 4002 in FIG. 4.

The image processor 102 performs various types of image processing on the inputted RGB multilevel image data and outputs the RGB multilevel image data to the data path controller 107 as CMYK binary print image data. The CMYK binary print image data is stored in the memory 103. This flow of image data corresponds to a data path 4003 in FIG. 4.

The CMYK binary data stored in the memory 103 is read out of the memory 103, outputted to the printer 104 via the data path controller 107, and printed. This flow of image data corresponds to a data path 4004 in FIG. 4.

When the number of copies to be printed is set to two or more, image data for the second and subsequent copies is outputted from the memory 103 and printed. This eliminates the need to read the same image data out of the image storage unit 108 again to perform image processing thereon for printing the second and subsequent copies. When a specified number of copies have been printed, the print operation is completed.

Settings for the Box Print operation are entered by the user through the operating device 109 and transferred to the CPU 110. Each processing unit in the MFP-A 100 operates under the control of the CPU 110. Screen messages associated with the user's setting process and the operating status of the MFP-A 100 are displayed on the display unit 902 to the user, according to data transferred from the CPU 110 to the operating device 109. This data exchange corresponds to data paths 4005 and 4006 in FIG. 4.

(Exemplary Send Operation)

Figure 5:
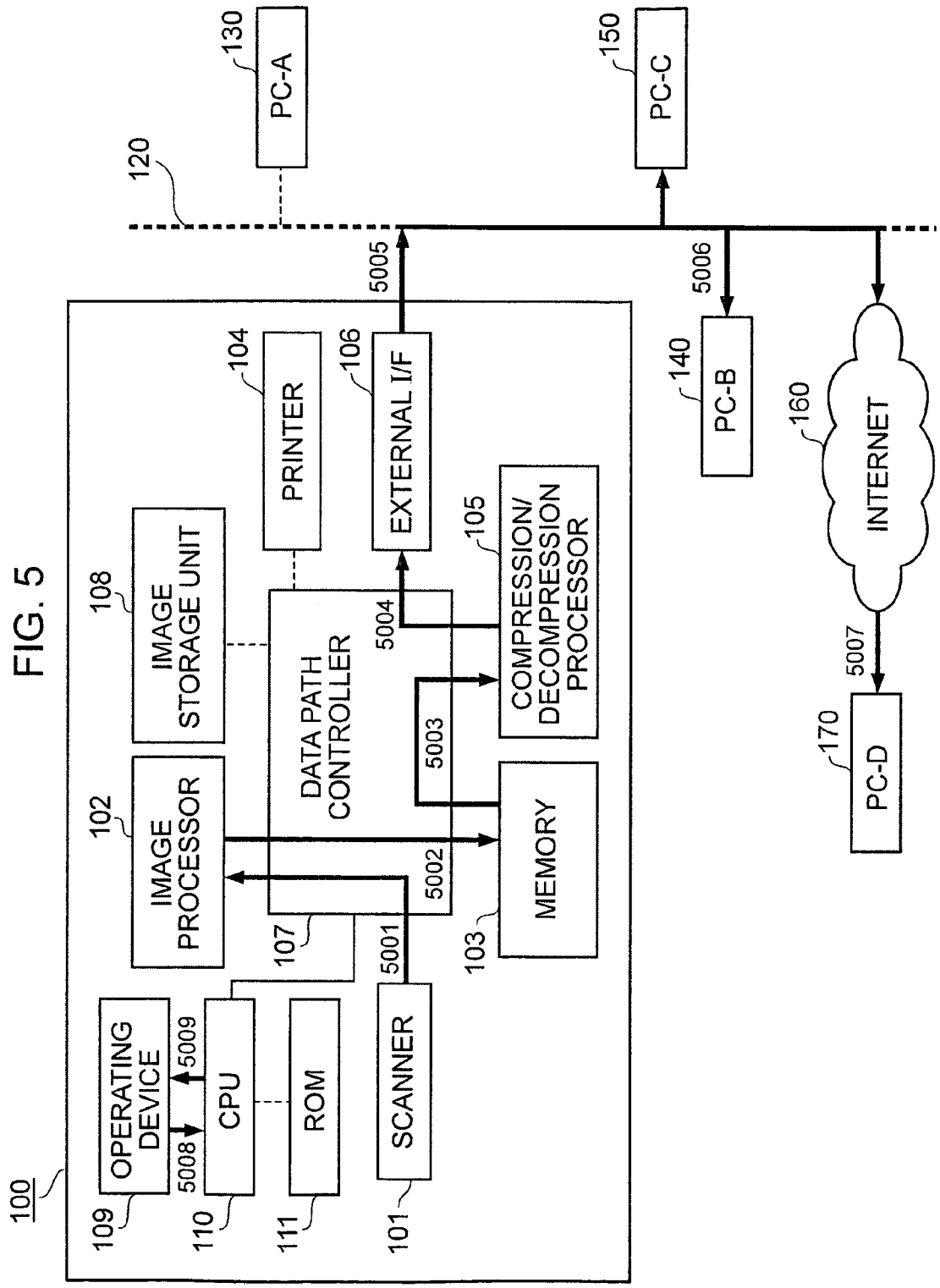
FIG. 5 shows an exemplary "Send" operation in which an image scanned by the MFP-A 100 is to be sent.

FIG. 5 shows an exemplary flow of image data in the MFP-A 100 when image data scanned by the scanner 101 is compressed, attached to an email message as an attachment, and sent to a different image processing apparatus or to a PC via network. This series of operations will be referred to as "Send". In FIG. 5, parts and components similar to those in FIG. 1 are assigned the same reference numerals.

The user uses the operating device 109 to specify the destination addresses of image data and to configure settings (e.g. resolution and image file format) associated with processing for the transmission of image data. Upon completion of the configuration of various settings, the user operates keys of the input unit 904 to start execution. In the present embodiment, the PC-B 140 and the PC-C 150 that are on the LAN 120 and the PC-D 170 on the Internet 160 are specified as the destinations of the image data. An MFP (not shown) connected to the LAN 120 or to the Internet 160 may also be specified as the destination.

Scanning (document scanning operation) performed by the scanner 101 allows document image data to be outputted as RGB data to the image processor 102, where predetermined image processing according to the user's configuration is performed. In the present embodiment, the image processor 102 converts the inputted RGB image data to RGB multilevel image data to be attached to an email message. This flow of image data corresponds to a data path 5001 in FIG. 5.

The image processor 102 performs various types of image processing and outputs the RGB multilevel image data to the data path controller 107 for use as an email attachment. The RGB multilevel data is stored in the memory 103. This flow of image data corresponds to a data path 5002 in FIG. 5.

After document image data has all been stored in the memory 103, the RGB multilevel data is read out of the memory 103 and outputted via the data path controller 107 to the compression/decompression processor 105. This flow of image data corresponds to a data path 5003 in FIG. 5.

Since uncompressed RGB multilevel image data has been inputted, the compression/decompression processor 105 performs JPEG compression processing on the RGB multilevel image data, which is then outputted to the data path controller 107 as image data for use as an email attachment and sent to the external I/F 106. This flow of image data corresponds to a data path 5004 in FIG. 5.

The external I/F 106 performs processing such that the inputted RGB multilevel JPEG image data is used as an attachment to an email message prepared according to the settings entered from the operating device 109, and outputs the processed image data to the LAN 120. This flow of image data corresponds to a data path 5005 in FIG. 5.

An email message with an attachment is outputted from the external I/F 106 of the MFP-A 100 and sent, in the same manner as a known email message, via the LAN 120 to the specified destinations, such as the PC-B 140, the PC-C 150, and the like. This flow of the email message corresponds to a data path 5006 in FIG. 5.

Since the PC-D 170 on the Internet 160 is also specified as a destination, the email message is sent to the PC-D 170 via the Internet 160. This flow of the email message corresponds to a data path 5007 in FIG. 5. A Simple Mail Transfer Protocol (SMTP) server and a Post Office Protocol (POP) server, which are generally involved in email transmission in the data paths 5006 and 5007, are omitted from the diagram of FIG. 5.

Settings for the Send operation are inputted by the user through the operating device 109 and transferred to the CPU 110. Each processing unit in the MFP-A 100 operates under the control of the CPU 110. Screen messages associated with the user's setting process and the operating status of the MFP-A 100 are displayed on the display unit 902 to the user, according to data transferred from the CPU 110 to the operating device 109. This data exchange corresponds to data paths 5008 and 5009 in FIG. 5.

(Exemplary Box to Send Operation)

Figure 6:
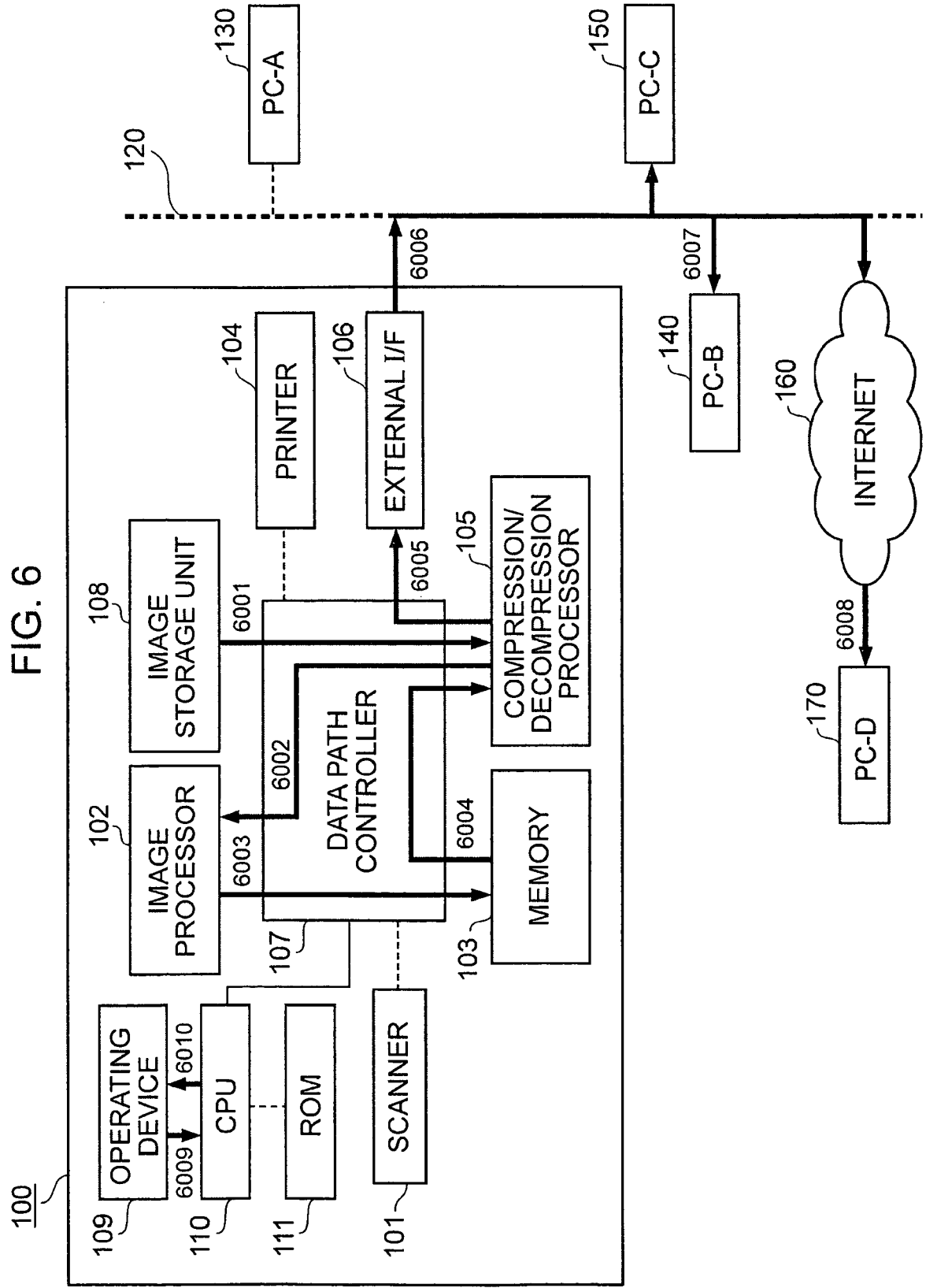
FIG. 6 shows an exemplary "Box to Send" operation in which an image stored in the image storage unit 108 of the MFP-A 100 is to be sent.

FIG. 6 shows a flow of image data in the MFP-A 100 when image data stored in the image storage unit 108 is subjected to image processing, attached to an email message as an attachment, and sent. This series of operations will be referred to as "Box to Send". In FIG. 6, parts and components similar to those in FIG. 1 are assigned the same reference numerals.

The user uses the operating device 109 to specify a particular box of the image storage unit 108 in which image data to be sent is stored, an image to be sent, the destination of the image, and various types of image processing modes (e.g., resolution) for data transmission. Upon completion of the configuration of various settings, the user operates keys of the input unit 904 to start transmission. As in the case of the Send operation described above, the PC-B 140 and the PC-C 150 that are on the LAN 120 and the PC-D 170 on the Internet 160 are specified as the destinations.

The image data stored in the above-described box in the image storage unit 108 and specified to be sent is outputted via the data path controller 107 to the compression/decompression processor 105 as JPEG-compressed RGB data. This flow of image data corresponds to a data path 6001 in FIG. 6.

Since RGB multilevel JPEG-compressed image data has been inputted, the compression/decompression processor 105 performs JPEG decompression processing on the RGB multilevel image data. The RGB multilevel image data subjected to JPEG decompression processing is outputted to the data path controller 107 and inputted into the image processor 102. This flow of image data corresponds to a data path 6002 in FIG. 6.

The image processor 102 performs various types of image processing on the inputted RGB multilevel image data and outputs the RGB multilevel image data to the data path controller 107 as RGB multilevel image data for "Send". The RGB multilevel data is stored in the memory 103. This flow of image data corresponds to a data path 6003 in FIG. 6.

After document image data has all been stored in the memory 103, the RGB multilevel data is read out of the memory 103 and outputted via the data path controller 107 to the compression/decompression processor 105. This flow of image data corresponds to a data path 6004 in FIG. 6.

Since uncompressed RGB multilevel image data has been inputted, the compression/decompression processor 105 performs JPEG compression processing on the RGB multilevel image data, which is then outputted to the data path controller 107 as image data for use as an email attachment and sent to the external I/F 106. This flow of image data corresponds to a data path 6005 in FIG. 6.

The external I/F 106 performs processing such that the inputted RGB multilevel JPEG image data is used as an attachment to an email message prepared according to the settings entered from the operating device 109, and outputs the processed image data to the LAN 120. This flow of image data corresponds to a data path 6006 in FIG. 6.

As in the case of the Send operation described above, an email message with an attachment is outputted from the external I/F 106 of the MFP-A 100 and sent via the LAN 120 to the specified destinations, such as the PC-B 140, the PC-C 150, and the like that are on the LAN 120, and the PC-D 170 on the Internet 160. This flow of the email message corresponds to data paths 6007 and 6008 in FIG. 6.

Settings for the Box to Send operation are entered by the user through the operating device 109 and transferred to the CPU 110. Each processing unit in the MFP-A 100 operates under the control of the CPU 110. Screen messages associated with the user's setting process and the operating status of the MFP-A 100 are displayed on the display unit 902 to the user, according to data transferred from the CPU 110 to the operating device 109. This data exchange corresponds to reference numerals 6009 and 6010 in FIG. 6.

Figure 10:
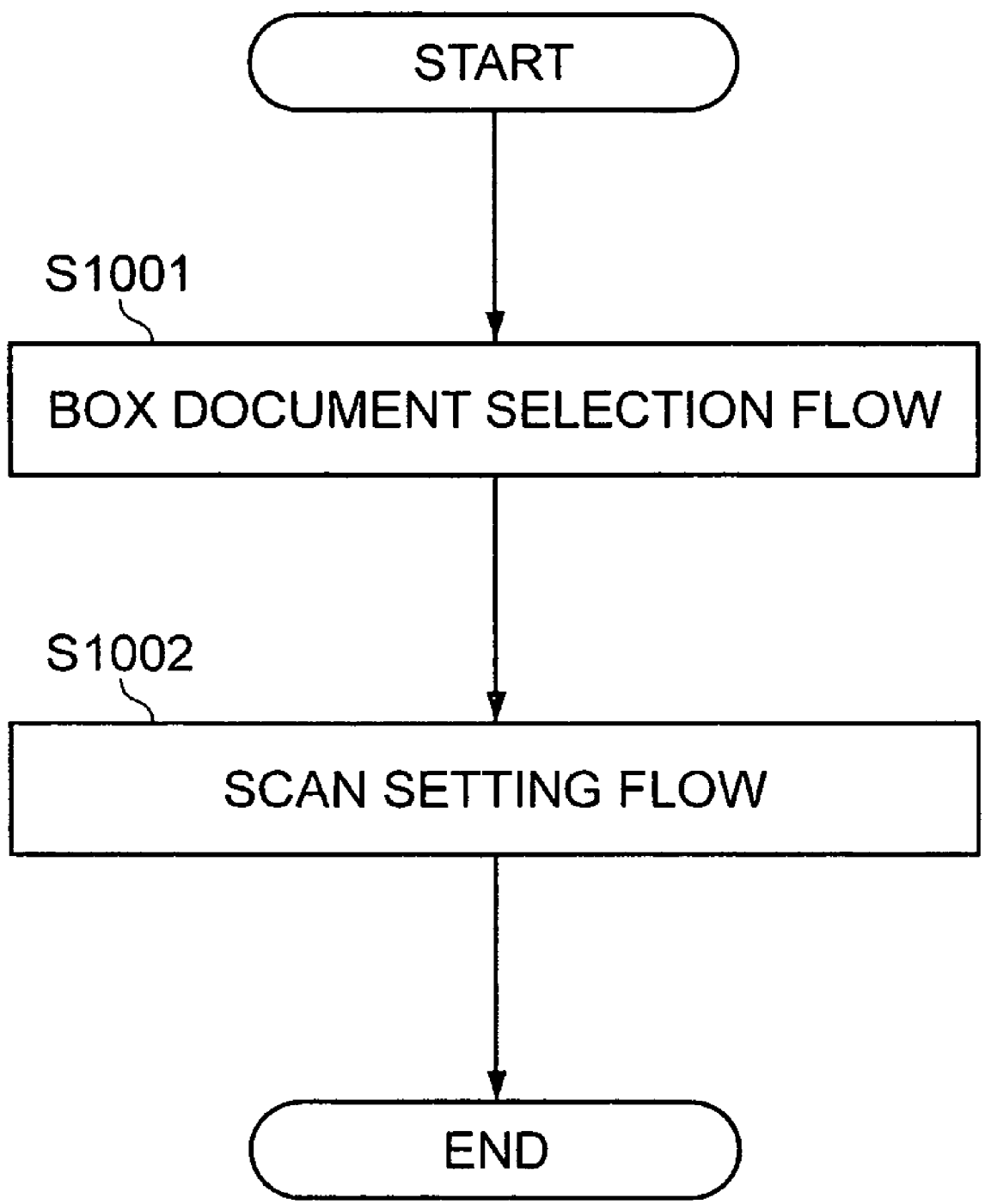
FIG. 10 shows an exemplary basic operation flow according to an embodiment of the present invention.

Next, an example of the configuration of scan settings using the file attributes of a box document stored in the image storage unit 108 will be described. FIG. 10 shows a basic flowchart of the present embodiment. The CPU 110 of the MFP-A 100 executes each processing in the flowchart. After a document is selected from a box in a box document selection flow (step S1001), settings for scanning (document scanning) are configured in a scan setting flow (step S1002).

Figure 11:
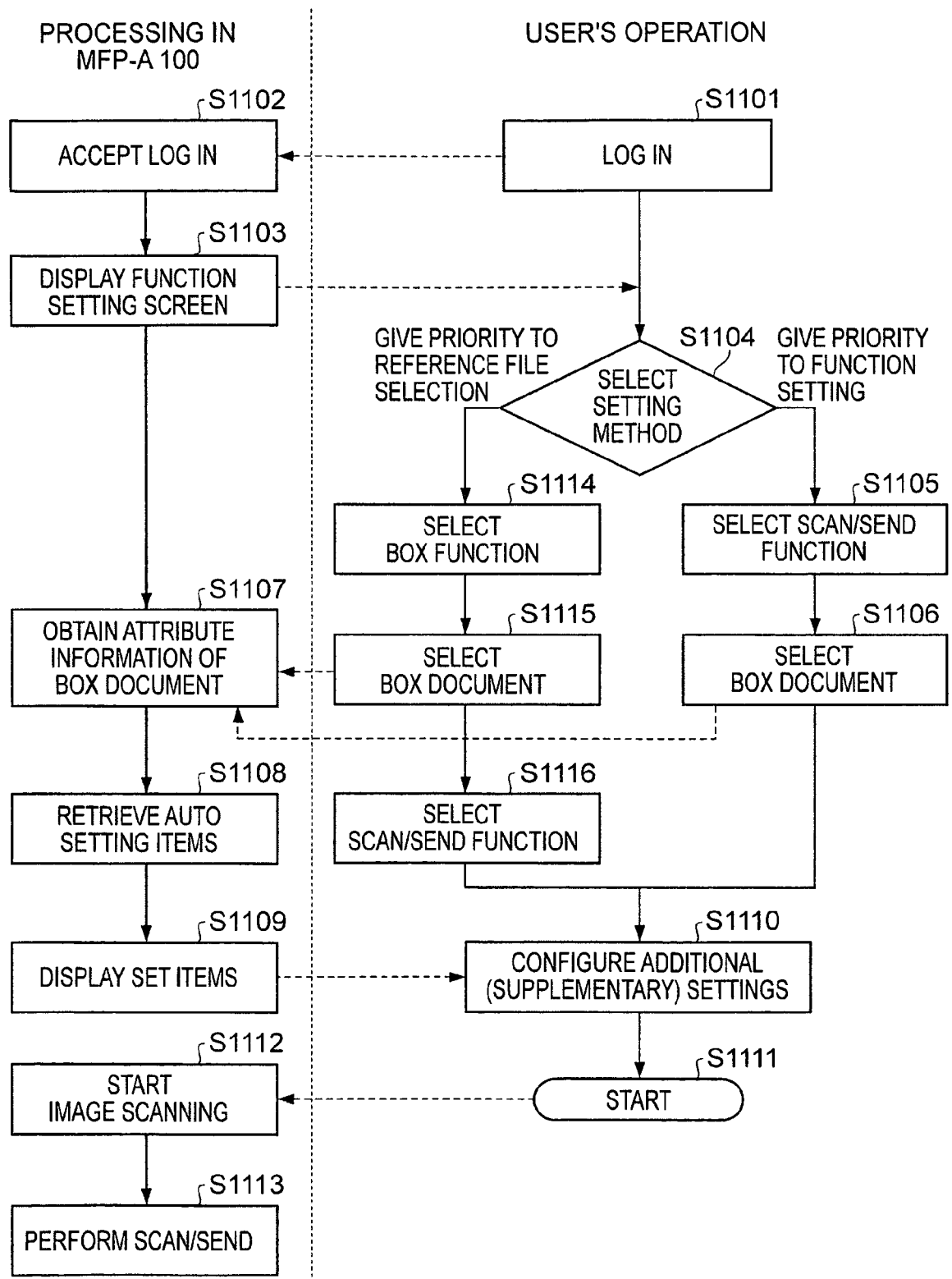
FIG. 11 shows an exemplary detailed version of the basic operation flow in FIG. 10.

FIG. 11 is a detailed version of the flowchart in FIG. 10. Processing performed by the MFP-A 100 is shown on the left, and processing that requires the user's involvement is shown on the right. Each processing will be described step by step.

First, the user logs in to the MFP-A 100 (step S1101). This does not necessarily have to be performed on the operating device 109 of the MFP-A 100 that authenticates the user. The MFP-A 100 accepts the log in (step S1102) and displays a function setting screen (step S1103). Then, the user selects a setting option for scan setting (step S1104).

If it is determined in step S1104 that priority is to be given to function setting, a scan setting screen (described below) is displayed on the display unit 902. For Send operation, the user specifies destinations and the like (step S1105) and selects a box document to which scan settings thereof are to be referred (step S1106).

On the other hand, if it is determined in step S1104 that priority is to be given to the selection of a file to be referred to, the user selects a "Box" tab (step S1114) on a setting screen (described below) and selects a box document (step S1115). Then, the user selects Scan or Send function (step S1116).

After a box document to be referred to has been selected according to either one of the two setting options described above, the MFP-A 100 obtains attribute information of the selected box document (step S1107). Then, the MFP-A 100 retrieves automatically configurable settings for the Scan operation (step S1108), automatically sets the configurable settings, and displays the settings on an operation screen (step S1109).

After the automatic configuration and display of scan settings, it becomes possible for the user to configure additional or supplementary setting (step S1110), such as whether a document to be scanned is a double-sided document. When the user presses a start button (step S1111), the MFP-A 100 starts scanning a document image (step S1112) and performs the Scan or Send function (step S1113).

Exemplary operations, according to the above-described process of scan setting, and the operation of the operating device 109 will now be described with reference to FIG. 12 to FIG. 21.

(First Exemplary Operation)

Figure 14:
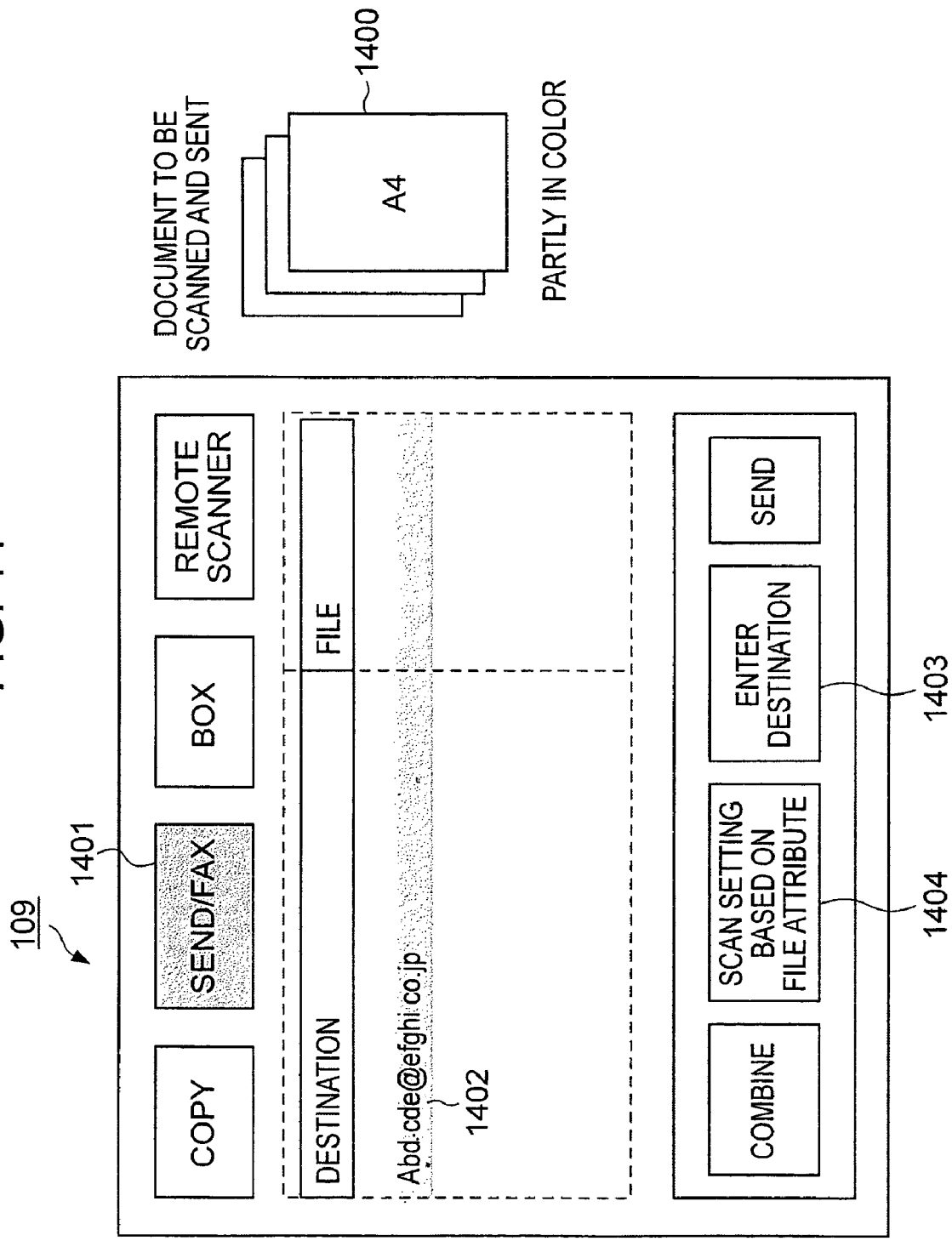
FIG. 14 shows an exemplary destination entry screen for "Send" setting in a first exemplary operation.
Figure 15:
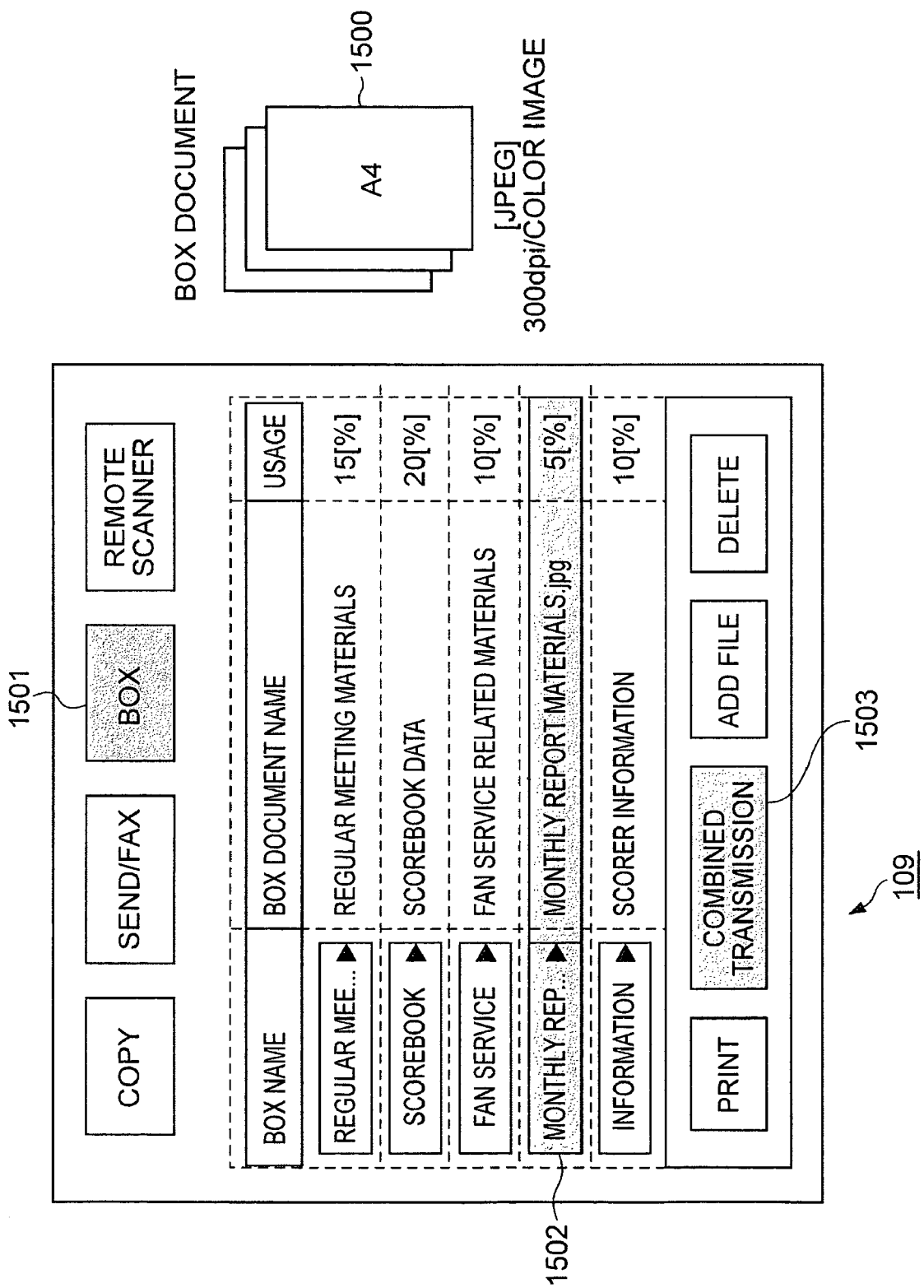
FIG. 15 shows an exemplary reference-file selection screen for the first exemplary operation.
Figure 16:
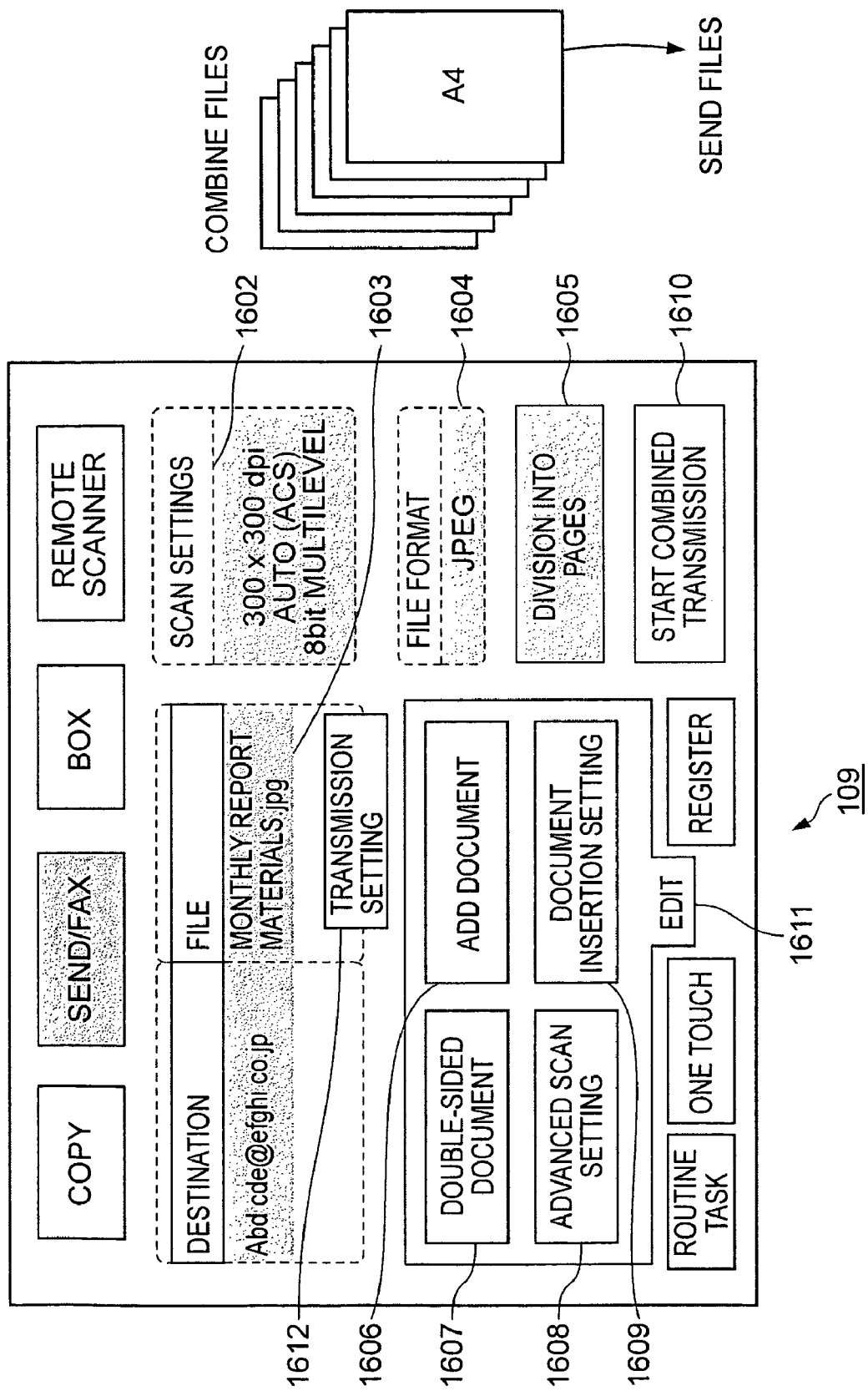
FIG. 16 shows exemplary auto scan settings and additional user settings in the first exemplary operation.

FIG. 14 to FIG. 16 show a first exemplary operation in which auto scan function setting is used to perform job combining that combines a box document with scanned document image data, and to perform Send operation. The attribute information of a document to be scanned and a box document to be combined with the scanned document is as follows:

Document to be scanned 1400: A4 size and partly in color; and

Box document 1500: A4 size, JPEG image file, 300 dpi in resolution, and color image.

These documents are combined and sent as an email message with an attachment. The attribute information of a box document may be included as part of the box document, or may be independent of but associated with the box document. Examples of the attribute information of a box document include the format type, resolution, the number of gradation levels, the number of colors, data size, and the dimensions of images. These examples apply to second to fourth exemplary operations described below.

When the user operates the operating device 109 to select a "Send/Fax" tab 1401 and an "Enter destination" key 1403 and enter an email address, a recipient's email address 1402 is displayed. Selecting a "Scan setting based on file attribute" key 1404 activates a "Box" tab 1501 and displays a screen as shown in FIG. 15.

Referring to FIG. 15, the user selects, on the screen of the operating device 109, a box document "monthly report materials.jpg" 1502, to which its scan settings are to be referred and with which a scanned document is to be combined. Then, pressing a "Combined transmission" key 1503 on the operating device 109 displays a "Send/Fax" setting screen as shown in FIG. 16.

Selecting the "Combined transmission" key 1503 on the screen in FIG. 15 allows a destination email address and a filename "monthly report materials.jpg" 1603 of a box document, which is to be attached to the email message, to appear on the screen in FIG. 16. The "monthly report materials.jpg" 1603 has not yet been subjected to job combining. Then, the attribute information of the box document 1500 indicated by the "monthly report materials.jpg" 1603 is obtained. Settings, such as Scan settings 1602: 300 dpi×300 dpi, auto color selection (ACS), and 8-bit multilevel;

File format 1604: JPEG;

Division into pages 1605: enabled; and

Filename 1603: filename of a box document that a scanned document is to be combined with, are determined to be automatically configured settings, and are displayed in such a manner that it is identifiable to the user that the configuration of these settings has been completed. Based on these automatically configured settings, the user configures additional settings.

Still referring to FIG. 16, an "Edit" tab 1611 provides menu items that would soon become necessary at the front and allows more detailed settings to be configured separately. For example, since the box document 1500 that a scanned document is to be combined with is not a print object, such as page description language (PDL) data, no print-related settings, such as duplex printing and the like, are configured. For the user to specify whether a document to be scanned is a double-sided document, a "Double-sided document" key 1607 is displayed at the front. Simply pressing the "Double-sided document" key 1607 allows the configuration of settings that enables the scanning of a double-sided document.

The "Edit" tab 1611 also provides an "Add document" key 1606 for combining an additional document, an "Advanced scan setting" key 1608 for configuring detailed scan settings, and a "Document insertion setting" key 1609 (described in detail below) for specifying the position in a box document where an image data produced by scanning a document is to be inserted. While not shown, "Change the name of combined file" allows the user to change the screen to configure advanced settings. While also not shown, "Document insertion setting" allows the user to define the default setting, such as "Insert after the document by default". A system with a user authentication capability can store setting information for each user.

When the configuration of these supplementary settings has been completed and a "Start combined transmission" key 1610 has been pressed, the MFP-A 100 sequentially performs Scan operation, job combining operation, and Send operation.

A box document to which its scan settings are to be referred can be specified separately from a box document with which a scanned document is to be combined. It is also possible to configure such that the original box document is overwritten with a document produced by job combining and is stored in a box. If a document created by job combining is given a name different from that of the original box document, the created document can be stored separately from the original box document.

Moreover, it is also possible to obtain only the scan settings of the specified box document without performing job combining. This becomes possible if a menu displayed by pressing a "Transmission setting" key 1612 provides an option, such as "Send scanned file only". In this case, the key label of the "Start combined transmission" key 1610 is changed to "Start transmission" to start Send operation.

(Second Exemplary Operation)

A second exemplary operation will now be described with reference to FIG. 17 to FIG. 19. As in the case of the first exemplary operation, auto scan function setting is used to perform job combining that combines a box document with scanned document image data, and to perform Send operation. However, the second exemplary operation differs from the first exemplary operation in terms of the operating procedure.

The attribute information of a document to be scanned and a box document to be combined with the scanned document is as follows:

Document to be scanned 1900: A3 size, partly in color, and intended to be combined into a monochrome document; and Box document 1700: A4 size, PDF file, 600 dpi in resolution, and monochrome image.

These documents are combined and sent as an email message with an attachment. The second exemplary operation corresponds to the steps that follow "Give priority to reference file selection" in step S1104 in FIG. 11.

Figure 17:
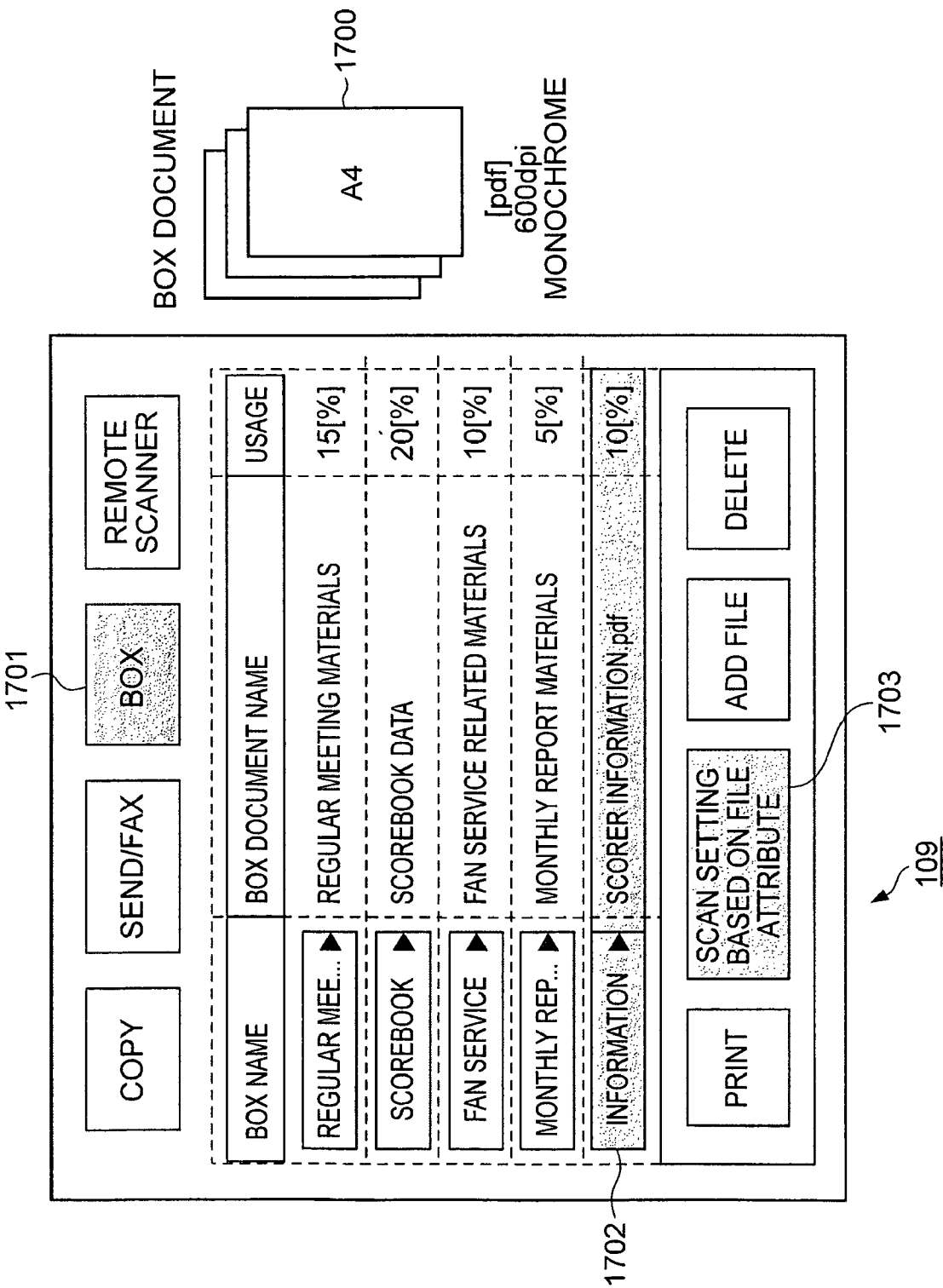
FIG. 17 shows an exemplary screen displayed when priority is given to a reference-file selection flow in a second exemplary operation.

The user selects a "Box" tab 1701 to display a box screen shown in FIG. 17, and selects a box document "scorer information.pdf" 1702, to which its scan settings are to be referred and with which a scanned document is to be combined. Then, pressing a "Scan setting based on file attribute" key 1703 displays an exemplary scan setting screen shown in FIG. 18.

The transmission settings configured in the first exemplary operation allow the "Combined transmission" key 1503 to be displayed as shown in FIG. 15. However, the "Scan setting based on file attribute" key 1703 is displayed on the screen in FIG. 17, as it is not known at this point whether combined transmission is to be performed.

Then, based on the attribute information obtained from the box document 1700 specified in FIG. 17, configurable scan settings, such as Scan settings 1802: 600 dpi×600 dpi;

File format 1804: PDF;

Division into pages 1805: disabled; and

Figure 18:
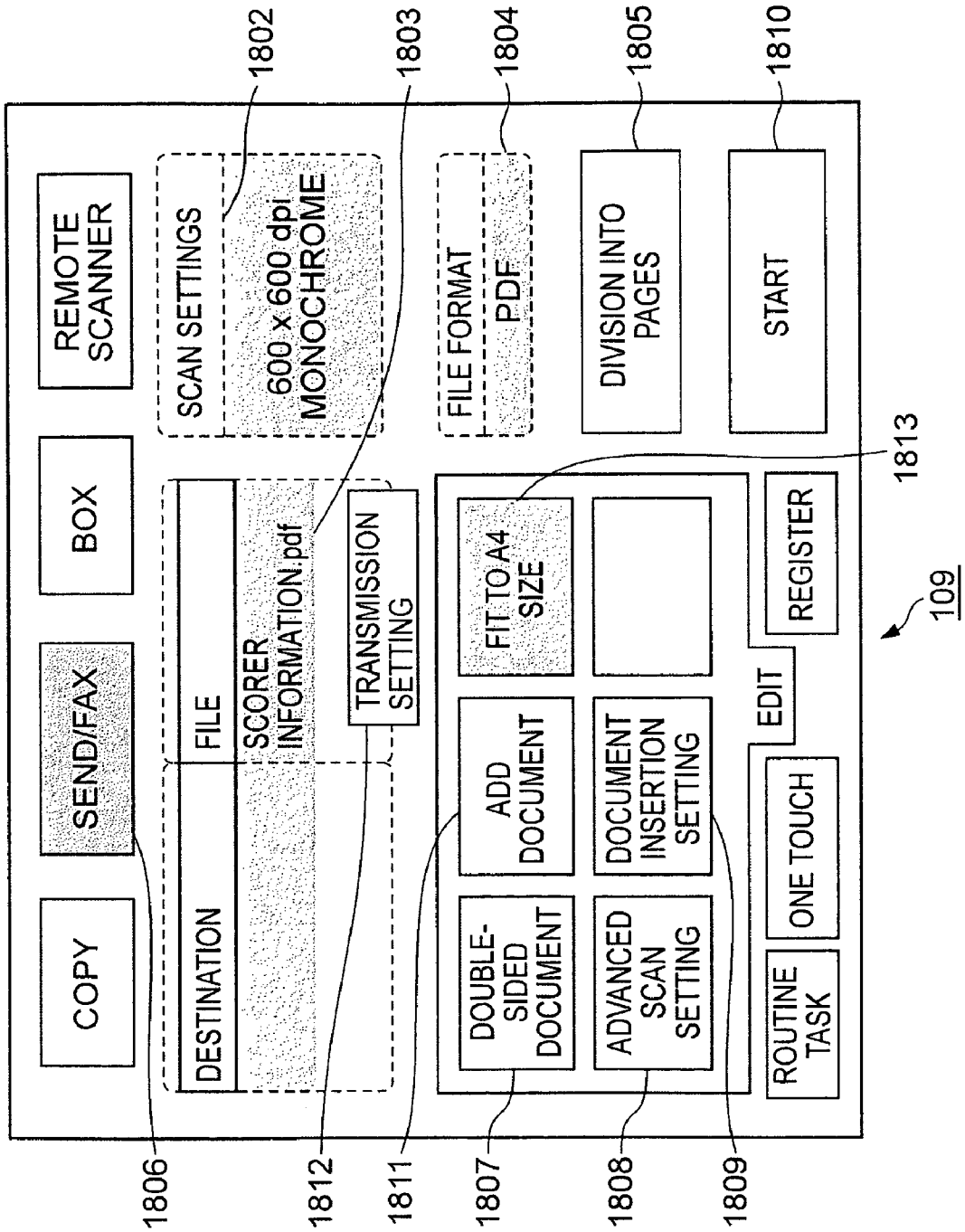
FIG. 18 shows exemplary auto scan settings in the second exemplary operation.

Filename 1803: filename of a box document that a scanned document is to be combined with, are automatically configured on the scan setting screen shown in FIG. 18.

Referring to the scan setting screen shown in FIG. 18, as in the case of the second exemplary operation, an "Edit" tab displays menu items that are likely to be selected for additional setting at the front. A "Double-sided document" key 1807 is displayed in such a manner that the user is prompted to configure settings. A "Fit to A4 size (i.e., the paper size of a document that a scanned document is to be combined with)"

key 1813 is selected by default. If a document that is not an A4-size document (such as an A3-size document in this exemplary operation) has been scanned in, the size is automatically changed to A4 size and job combining is performed.

Selecting an "Advanced scan setting" key 1808, an "Add document" key 1811, or a "Document insertion setting" key 1809 (described below with reference to FIG. 23) changes the screen and allows the user to configure advanced settings. Also, a "Send/Fax" button 1806 and "Start" button 1810 are provided.

Figure 19:
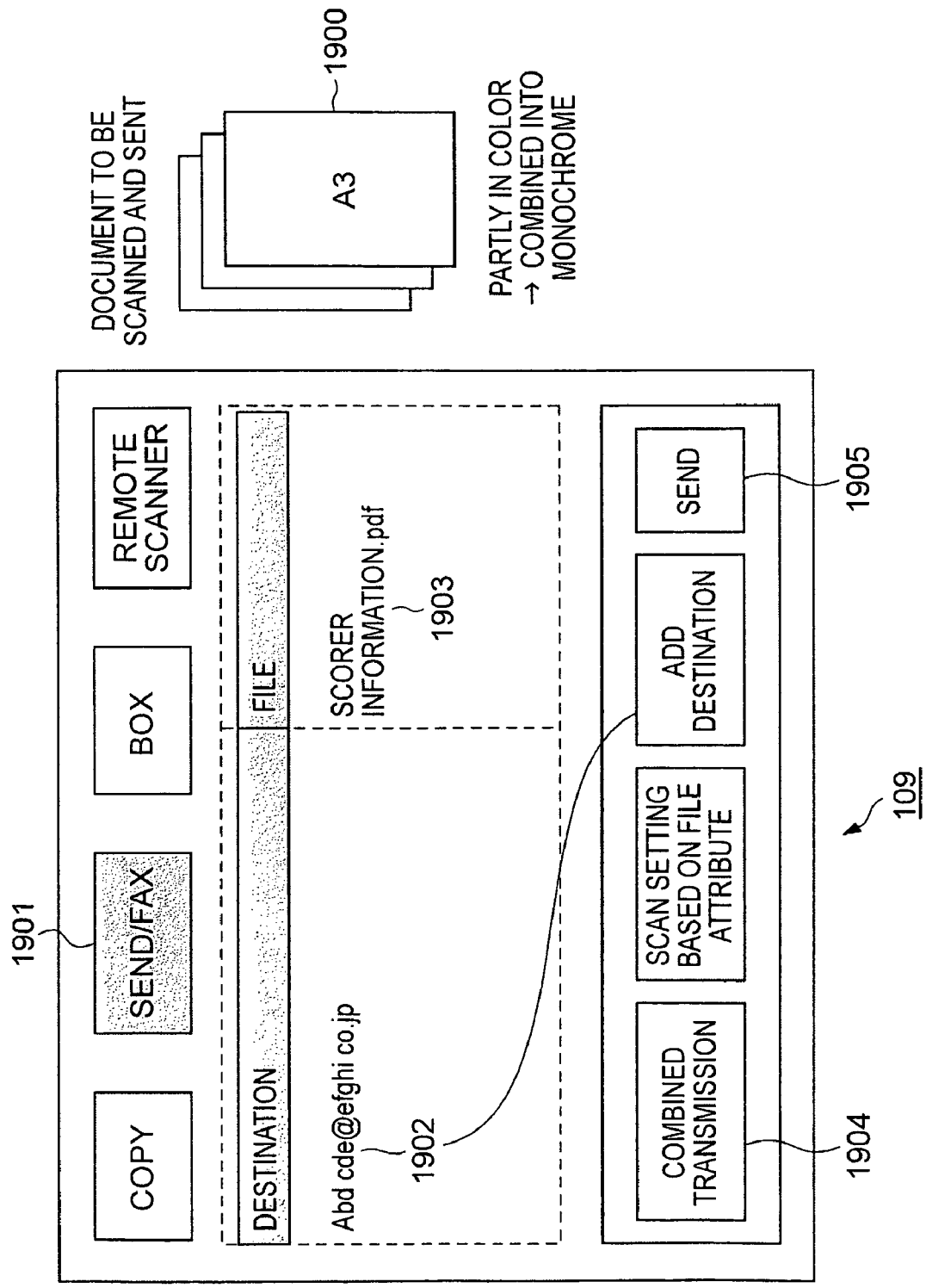
FIG. 19 shows exemplary send settings in the second exemplary operation.

Selecting a "Transmission setting" key 1812 changes the screen to another exemplary screen as in FIG. 19. When the user enters a destination email address, an email address 1902 appears in a destination field. The name of a box document 1903 that a scanned document is to be combined and sent with is displayed in a "File" field. Then, selecting a "Combined transmission" key 1904 causes Scan operation, job combining operation, and Send 1905 operation to be performed sequentially. Also, the screen shown in FIG. 19 includes a "Send/Fax" button 1901 and a "Send" button 1905.

As in the case of the first exemplary operation, the original box document can be sent without performing job combining. It is also possible that a document produced by job combining overwrites the original box document or is saved with a different name.

(Third Exemplary Operation)

Figure 20:
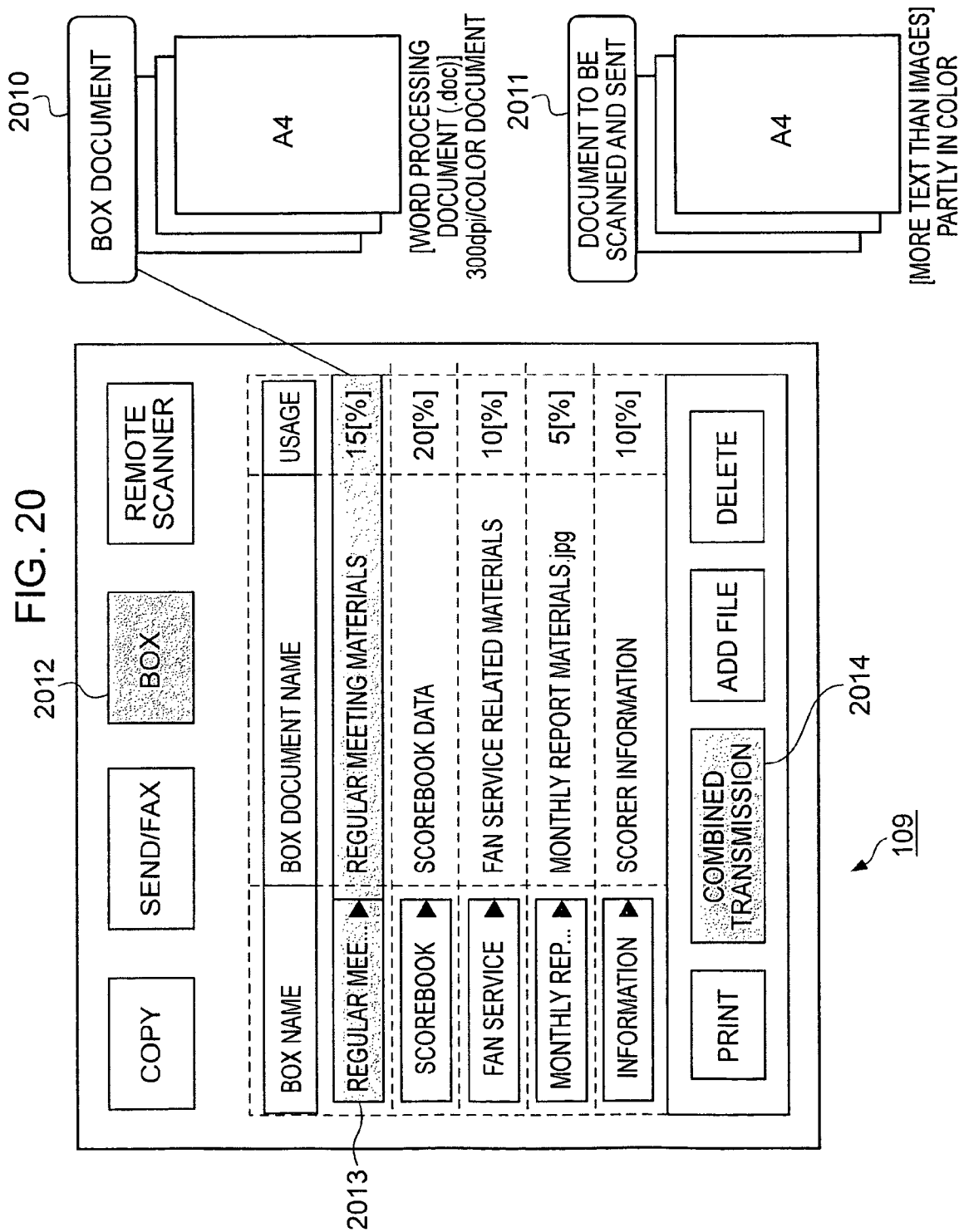
FIG. 20 shows an exemplary screen for selecting a file to be referred to for the configuration of settings in a third exemplary operation.

A third exemplary operation will now be described with reference to FIG. 20 to FIG. 22. As in the cases of the first and second exemplary operations described above, the third exemplary operation involves job combining and the subsequent Send operation. However, the third exemplary operation differs from the first and second exemplary operations in that a box document is created with a PC application, such as a word processing application. The details of the third exemplary operation will be described below.

The attribute information of a document to be scanned 2011 and a box document 2010 to be combined with the scanned document is as follows:

Document to be scanned 2011: A4 size, partly in color, and more text than images; and Box document 2010: A4 size, document file created with word processing application, 300 dpi in resolution, and partly in color.

These documents are combined and sent as an email message with an attachment. First, on a destination setting screen, such as that shown in FIG. 14, the user selects an "Enter destination" key and a "Scan setting based on file attribute" key. As shown in FIG. 20, this activates a "Box" tab 2012 and allows box documents to be selectable. The user selects a box document "regular meeting materials" 2013, to which its scan settings are to be referred and with which a scanned document is to be combined. Then, pressing a "Combined transmission" key 2014 displays a scan setting screen for transmission and activates a "Send/Fax" tab 2101, as shown in FIG. 21.

Figure 21:
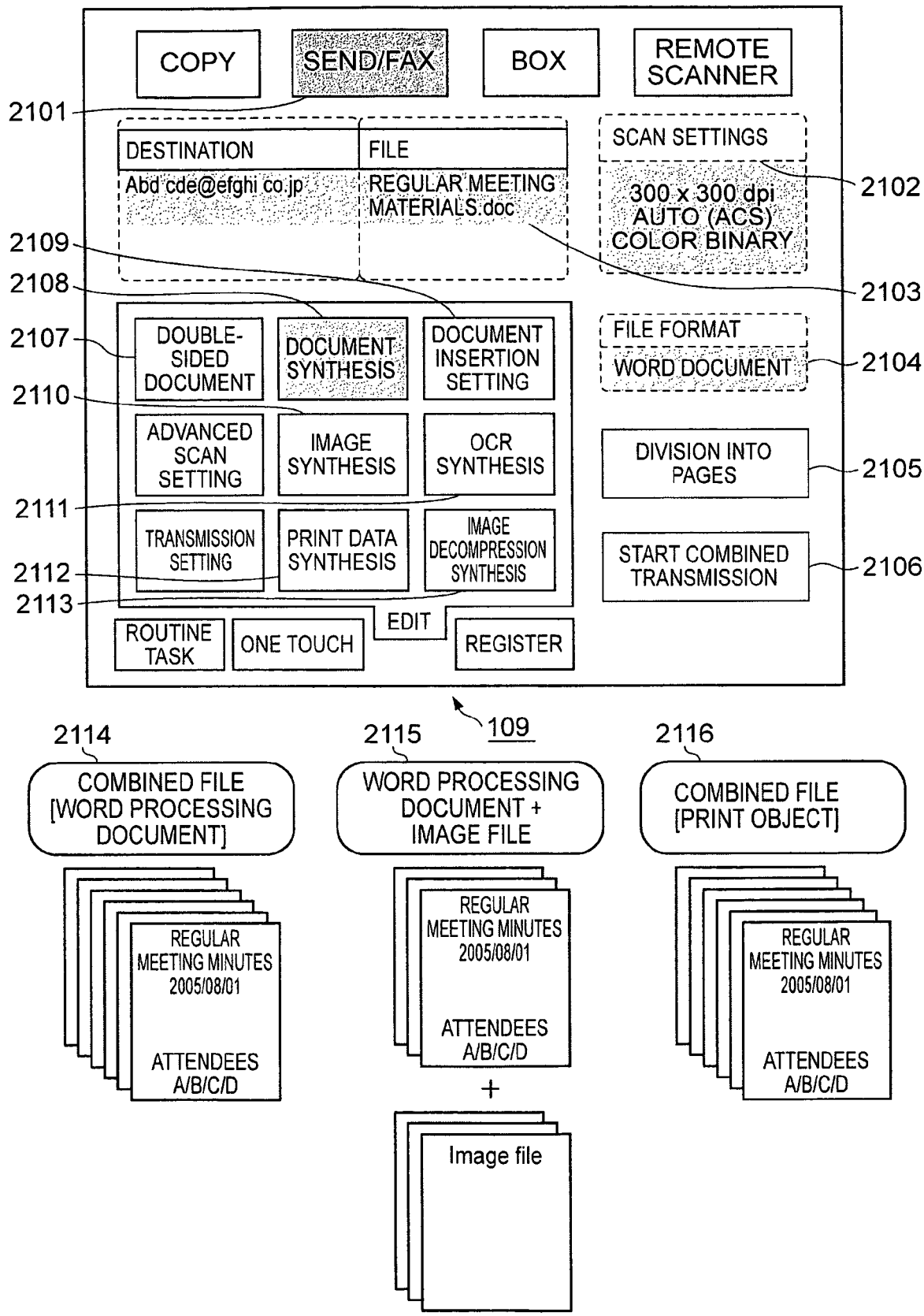
FIG. 21 shows an exemplary setting screen for job combining in the third exemplary operation.

The screen shown in FIG. 21 displays settings, such as

Scan settings 2102: 300 dpi×300 dpi, ACS, and color binary;

File format 2104: word processing document file;

Division into pages 2105: not necessary;

Filename 2103: filename of a box document that a scanned document is to be combined with; and Destination: entered in such a manner that it is identifiable to the user that these settings are automatically configured based on the attribute information of the box document 2010.

If a document to be scanned is a double-sided document, the user activates a "Double-sided document" key 2107. Selecting a "Document insertion setting" key 2109 (described below with reference to FIG. 23), an "Advanced scan setting" key, or the like changes the screen and allows the user to configure advanced settings.

Since document files created with a word processing application, which is a PC application, are to be integrated in the third exemplary operation, processing steps vary depending on the capability of the MFP to be used.

A detailed description will now be made with reference to a flowchart in FIG. 22 and a setting screen shown in FIG. 21. Exemplary processing shown in FIG. 22 is basically performed by the MFP-A 100 while partly performed by the user.

Figure 22:
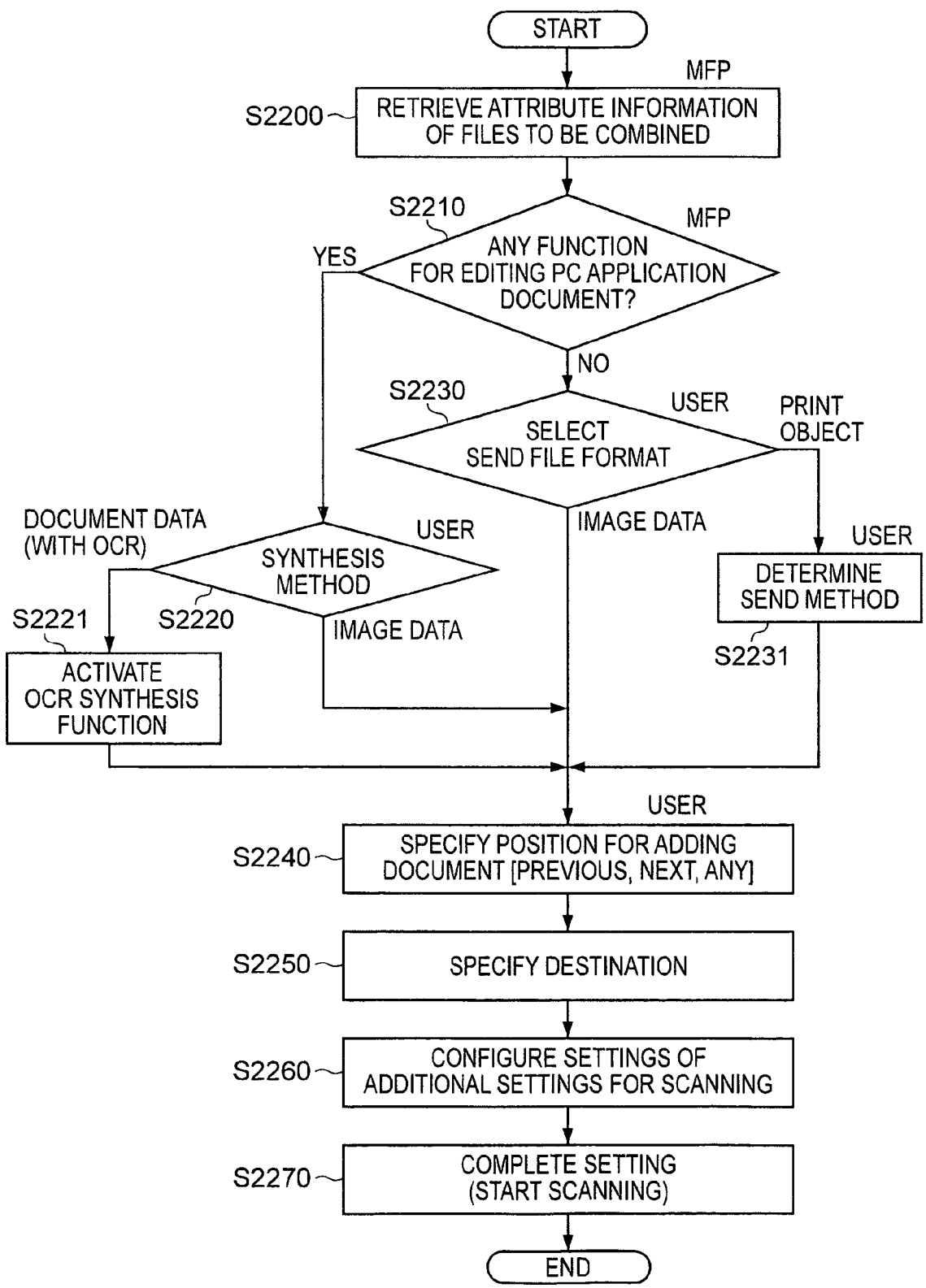
FIG. 22 shows a selection flow of job combining in the third exemplary operation.

As shown in FIG. 22, when the MFP-A 100 retrieves the attribute information of files to be combined (step S2200), the subsequent steps vary depending on whether the MFP-A 100 is capable of recognizing or editing a PC application document (step S2210). First, a case where the MFP-A 100 is capable of processing a PC application document ("Yes" in step S2210) will be described.

In this case, the user selects a method for combining jobs. For example, if the MFP-A 100 has a character recognition capability, such as an optical character recognition (OCR) capability (step S2220 branches to "document data"), job combining can be performed by inserting a character string recognized by scanning a document into the box document 2010 as characters. If an "OCR synthesis" key 2111 is selected on the setting screen in FIG. 21, the MFP-A 100 activates the OCR synthesis function (step S2221) and waits for instructions for the start of scanning operation.

Some models of MFPs are capable of separately managing text and image portions of scanned document image data. Such MFPs are also capable of defining, on the operating device 109, in detail how to integrate text with images. In this case, documents combined by job combining are integrated into a PC application file 2114.

If an MFP has no character recognition capability and the user would like to combine a scanned document as image data (such as JPEG data) with the end of a word processing document (step S2220 branches to "image data"), the user selects an "Image synthesis" key 2110 in FIG. 21 and proceeds to the next step.

Next, a case where the MFP-A 100 has no capability of editing a PC application document ("No" in step S2210) will be described. In particular, next, the send file format is selected by the user (step S2230). Since the above-described capability of referring to scan settings is no longer effective, the MFP displays a message, such as "There are no configurable settings". If a "Combined transmission" key is selected in the setting process, the MFP displays a "Send simultaneously as a separate file" key to prompt the user to select it. Even if the user selects the "Image synthesis" key 2110, a box document cannot be modified after scanning. Therefore, two files 2115 are attached to an email message as separate files and sent.

In a case where the MFP-A 100 has no capability of editing a PC application document, if a box document that a scanned document is to be combined with is stored as a print object in a box and a "Print data synthesis" key 2112 is selected, scanned document image data is converted to a print object, combined with the box document to form a combined file 2116, and sent. Examples of the print object here include PDL data and intermediate data generated in the process of the expansion of PDL data into a bitmap image.

However, since it is less likely that a print object itself is sent, an email message containing a link (such as a uniform resource locator (URL) or a file path) to the storage location of a print object is sent (step S2231). The user receives the link information, accesses the MFP-A 100 by remote operation or the like, transfers the print data to a different MFP, and receives printed paper.

Moreover, an "Image decompression synthesis" key 2113 is provided for allowing the restoration of the original image data from a print object, and the job combining and transmission of the restored image data.

After a synthesis method or a send method is selected on the operation screen, a position to which a document is to be added is determined (step S2240), additional settings for a destination (step S2250) and scanning (step S2260) are configured. After the configuration of all settings, scanning (step S2270) and other predetermined operations are performed and the flow in FIG. 22 ends.

Thus, the above-described processing allows job combining and data transmission even if a PC application file is stored in a box without being edited.

Figure 23:
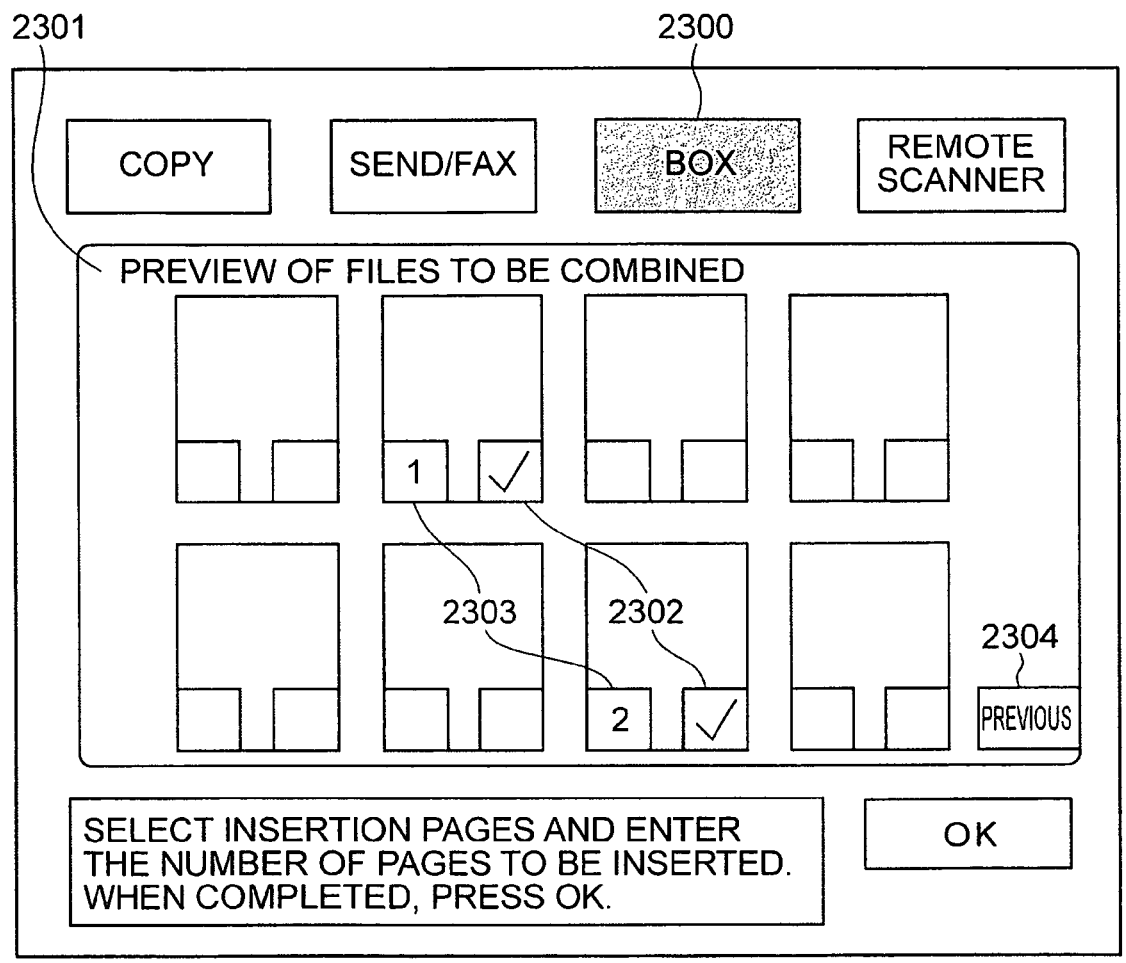
FIG. 23 shows exemplary settings of document insertion in an embodiment of the present invention.

The operation of "document insertion setting" will now be described with reference to FIG. 23. Pressing the "Document insertion setting" keys 1609, 1809, and 2109 in FIGS. 16, 18, and 21, respectively, displays an operation screen, such as that shown in FIG. 23. A "Box" tab 2300 is activated and a preview window 2301 displays thumbnails (reduced images) of box documents that a scanned document is to be combined with. Insertion settings may be grayed out if the file format of a box document does not support thumbnail display.

Each thumbnail is provided with a checkbox 2302, an insertion count box 2303 for entering the number of pages to be inserted, and an insertion positioning box 2304 for selecting whether scanned data is to be inserted before or after a checked thumbnail. Upon completion of the user's entry of desired settings, the insertion of scanned document image data and job combining are performed according to the settings. Normally, scanned data is inserted in order of scanning into the box documents according to the page numbers of the box documents.

Although the first to third exemplary operations describe the cases where scanned document image data is combined with a box document and sent, document data after job combining may be stored in a box again.

For job combining of a scanned image and a box document in the first to third exemplary operations described above, the scan settings of a document image to be scanned are automatically configured using the setting values of a box document that the scanned document is to be combined with. This allows easy integration of both settings.

(Fourth Exemplary Operation)

A fourth exemplary operation will now be described with reference to FIG. 12 and FIG. 13. Although job combining as in the first to third exemplary operations will not be performed here, the fourth exemplary operation involves the configuration of scan settings.

A document 1300 to be photocopied by the user is double-sided, color, and A3-size document. The user wants to photocopy the document 1300 onto A4-size paper. The user previously printed a box document with the same output settings as this, and wants to use the same settings here.

Figure 12:
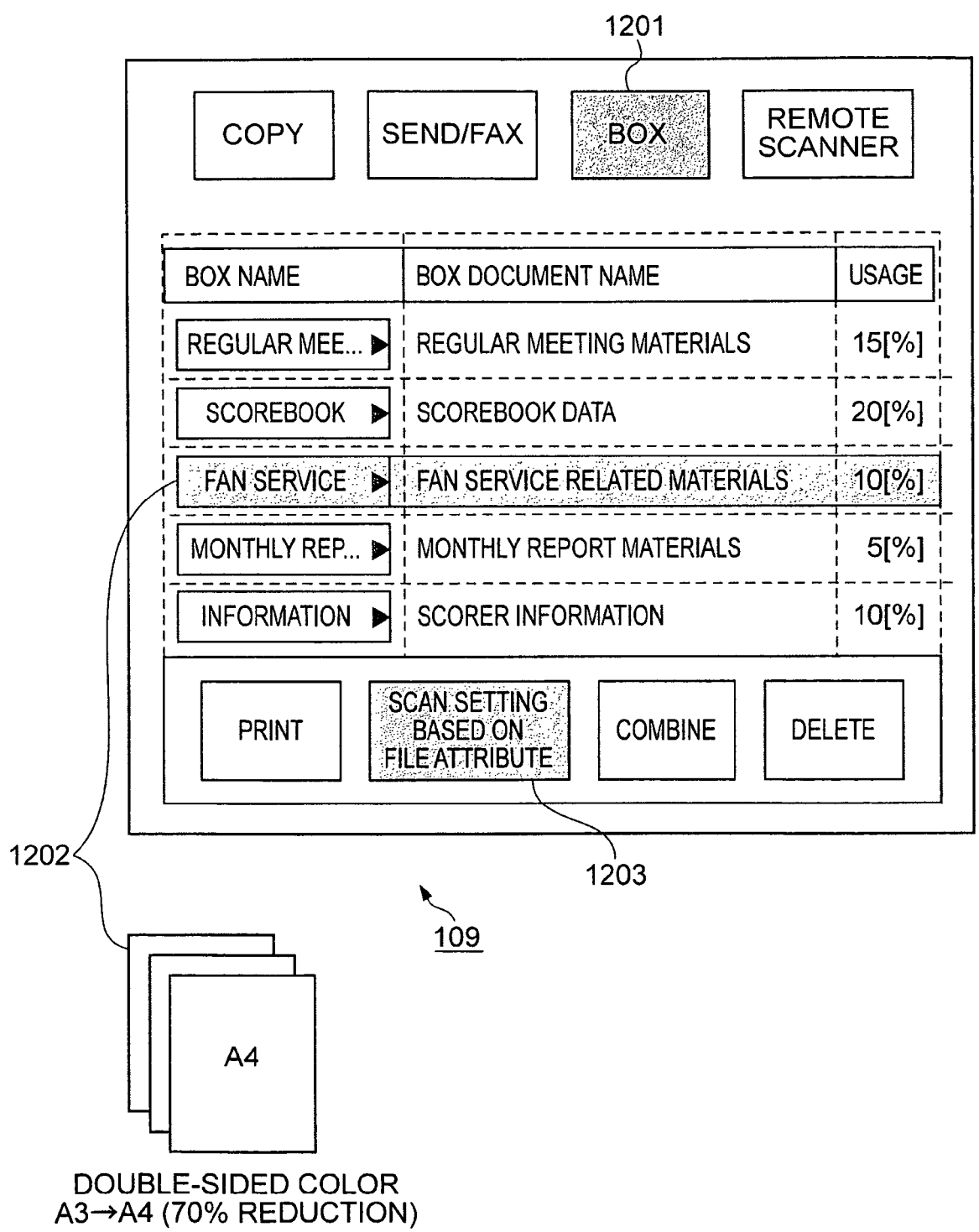
FIG. 12 shows an exemplary screen for selecting a file to be referred to for the configuration of copy settings in a fourth exemplary operation.

The user selects a "Box" tab 1201 on an exemplary operation screen in FIG. 12 and selects a box document "fan service related materials" 1202 to refer to the settings thereof. Information obtained from this box document is as follows:

Duplex printing;
Color image; and
Reduction from A3 to A4.

Figure 13:
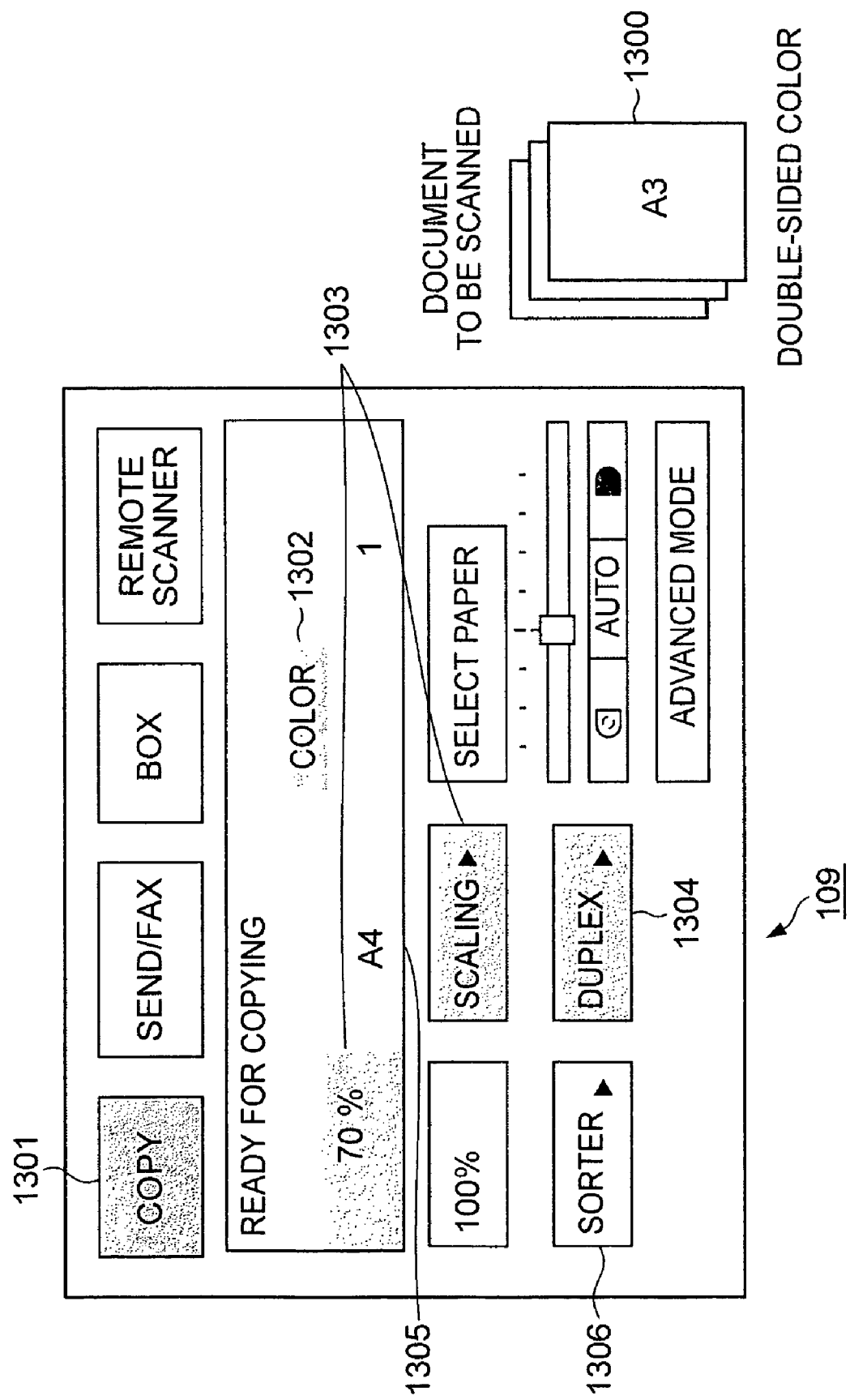
FIG. 13 shows exemplary auto scan settings and user settings in the fourth exemplary operation.

Next, the user presses a "Scan setting based on file attribute" key 1203 shown in FIG. 12 and a "Copy" tab 1301 shown in FIG. 13. This user's operation changes the screen to an exemplary copy setting screen shown in FIG. 13. As shown, configurable scan settings retrieved from file attributes are automatically configured on an operation screen and displayed in such a manner that already-configured settings are identifiable to the user. The configured settings are as follows:

Color scanning (1302);
Scaling 70% (1303); and
Duplex printing (1304).

Also, it is noted that the paper size (A4 in this example) is displayed in a "Ready For Copying" box 1305 provided on exemplary copy setting screen shown in FIG. 13, as well as the color 1302 and scaling 1303. It is also possible that settings (such as the number of copies and finishing 1306) that allow additional configuration by the user are displayed in such a manner that they are identifiable to the user.

Pressing a copy start button after the completion of the above-described setting can reduce the number of setting-related items. It is also possible that the user modifies the automatically configured settings.

In the fourth exemplary operation where job combining is not performed, it is possible, for the configuration of copy settings, to refer to and use the attribute information and setting values of a box document stored in a box. This simplifies the complex process of configuring copy settings.

As described above, in the present embodiment, scan settings for scanning a document image is automatically configured based on the settings of a box document stored in a box. This reduces the user's burden of configuring scan settings. Moreover, when job combining combines a scanned document image with a box document, the settings of the document image can be integrated with the settings of the box document. This eases the user's handling of a document after job combining.

Other Exemplary Embodiments, Features and Aspects of the Present Invention

The present invention includes a case where a software program that performs the functions of the above-described embodiments is supplied directly or from a remote device to a system or apparatus, and a computer of the system or apparatus reads and executes the supplied program code to perform the functions of the above-described embodiments. The program does not necessarily have to be in the form of a program, as long as it has the functions of the program.

The program code that is installed in the computer for performing the functional processing of the present invention also achieves the present invention. In other words, the computer program for performing the functional processing of the present invention is also included in the present invention.

The program may take any form, including object code, a program executed by an interpreter, or script data supplied to an operating system (OS), as long as it has the functions of the program.

Examples of a recording medium for supplying the program include a flexible disk, a hard disk, an optical disk, a magneto-optical (MO) disk, a compact-disk read-only memory (CD-ROM), a CD-recordable (CD-R), a CD-rewritable (CD-RW), a magnetic tape, a nonvolatile memory card, a ROM, and a digital versatile disk (DVD) (e.g. a DVD-ROM and a DVD-R).

In another possible method of supplying the program, the computer program of the present invention or a file produced by compressing the computer program of the present invention and provided with an automatic installation function is downloaded into a recording medium, such as a hard disk, from an Internet site accessed through a browser on a client computer. In another possible supplying method, program code included in the program of the present invention is divided into a plurality of files, which are then downloaded from different Internet sites. Therefore, a World Wide Web (WWW) server that allows a plurality of users to download program files for performing the functional processing of the present invention in computers is also included in the scope of the present invention.

In another possible method, the program of the present invention is encrypted, stored in a storage medium, such as a CD-ROM, and distributed to users. Then, users who meet predetermined conditions download key information that decrypts the encrypted program from an Internet site, use the key information to execute and allow the encrypted program to be installed in computers, thereby allowing the functions of the program of the present invention to be performed.

In addition to the cases where the functions of the above-described embodiments are performed when a computer reads and executes the program, there are other cases where the functions of the above-described embodiments are performed. For example, on the basis of instructions of the program, an OS running on the computer carries out all or part of the actual processing. This also allows the functions of the above-described embodiments to be performed.

The functions of the above-described embodiments are also performed when the program read out of a storage medium is written in a function expansion board in a computer or in a memory of a function expansion unit connected to a computer and then, on the basis of instructions of the program, the function expansion board or a CPU in the function expansion unit carries out all or part of the actual processing.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-192015 filed Jun. 30, 2005, which is hereby incorporated by reference herein in its entirety.

What is claimed is:

1. An image processing apparatus comprising:
a reading unit configured to perform a read process for reading a document image and creating image data;
a storing unit configured to store the image data created by the reading unit;
a specifying unit configured to receive from a user an instruction for specifying image data from among the image data which has been generated by the read process and stored in the storing unit; and
a setting unit configured to retrieve an attribute value of the image data specified by the specifying unit, and set the retrieved attribute value as at least a part of read settings for a read process of another document image,
wherein the reading unit performs a read process for reading another document image and creating another image data, in accordance with the read settings, the at least part of read settings which is set by the setting unit.

2. The image processing apparatus according to claim 1, further comprising a displaying unit configured to display the read settings, the at least part of read settings.

3. The image processing apparatus according to claim 2, wherein the displaying unit displays user-configurable settings, other than the at least a part of read settings set by the setting unit, on the displaying unit in an identifiable manner.

4. The image processing apparatus according to claim 1, further comprising a modifying unit configured to modify the at least part of read settings set by the setting unit.

5. The image processing apparatus according to claim 1, further comprising a combining unit configured to combine the other image data with the image data specified by the specifying unit to form combined image data.

6. The image processing apparatus according to claim 5, further comprising a sending unit configured to send the combined image data formed by the combining unit.

7. The image processing apparatus according to claim 1 wherein, if the attribute value of the image data specified by the specifying unit cannot be detected, the displaying unit displays a message indicating that there are no configurable settings to be set by the setting unit.

8. The image processing apparatus according to claim 1, further comprising:
a user setting unit configured to receive from a user an instruction for setting read settings for a read process,
wherein said read unit performs the read process in accordance with the read settings set by said user setting unit.

9. The image processing apparatus according to claim 8, wherein the at least a part of read settings set by said setting unit corresponds to at least a part of read settings which can be set by said user setting unit.

10. An image processing apparatus comprising:
a reading unit configured to perform a read process for reading a document image and creating image data;
a storing unit configured to store the image data created by the reading unit;
a specifying unit configured to receive from a user an instruction for specifying image data from among the image data stored in the storing unit; and
a setting unit configured to retrieve an attribute value of the image data specified by the specifying unit, and set the retrieved attribute value as at least part of read settings for a read process of another document image,
wherein the reading unit performs a read process for reading another document image and creating another image data, in accordance with the read settings, the at least part of read settings which is set by the setting unit,
wherein the image processing apparatus further comprises a combining unit configured to combine the other image data with the image data specified by the specifying unit to form combined image data,
wherein the image data specified by the specifying unit is overwritten with the combined image data formed by the combining unit in the storing unit.

11. An image processing apparatus comprising:
a reading unit configured to perform a read process for reading a document image and creating image data;
a storing unit configured to store the image data created by the reading unit;
a specifying unit configured to receive from a user an instruction for specifying image data from among the image data stored in the storing unit; and
a setting unit configured to retrieve an attribute value of the image data specified by the specifying unit, and set the retrieved attribute value as at least part of read settings for a read process of another document image,
wherein the reading unit performs a read process for reading another document image and creating another image data, in accordance with the read settings, the at least part of read settings which is set by the setting unit,
wherein the image processing apparatus further comprises a combining unit configured to combine the other image data with the image data specified by the specifying unit to form combined image data, wherein the storing unit changes the name of the combined image data formed by the combining unit from the name of the image data specified by the specifying unit and stores the combined image data separately from the image data specified by the specifying unit.

12. An image processing apparatus comprising:
a reading unit configured to perform a read process for reading a document image and creating image data;
a storing unit configured to store the image data created by the reading unit;
a specifying unit configured to receive from a user an instruction for specifying image data from among the image data stored in the storing unit;
a setting unit configured to retrieve an attribute value of the image data specified by the specifying unit, and set the retrieved attribute value as at least part of read settings for a read process of another document image;
a combining unit configured to combine the other image data with the image data specified by the specifying unit to form combined image data; and
an insertion positioning unit configured to specify a page insertion point in the image data specified by the specifying unit,
wherein the reading unit performs a read process for reading another document image and creating another image data, in accordance with the read settings, the at least part of read settings which is set by the setting unit,
wherein the combining unit inserts the other image data into the image data specified by the specifying unit at the page insertion point specified by the insertion positioning unit, thereby forming the combined image data.

13. A control method of an image processing apparatus, the method comprising:
a first reading step of performing a read process for reading a document image and creating image data;
a receiving step of receiving image data from an external apparatus;
a storing step of storing the image data created in the reading step or image data received in the receiving step, in a storage device;
a specifying step of receiving from an instruction for specifying image data from among the image data which has been generated in the first reading step or received in the receiving step, and has been stored in the storage device;
a setting step of retrieving an attribute value of the image data specified in the specifying step, and setting the retrieved attribute value as at least a part of read settings for a read process of another document image; and
a second reading step of performing a read process for reading another document image and creating another image data, in accordance with the read settings, the at least part of read settings of which is set in the setting unit.

14. A non-transitory computer readable storage medium containing computer-executable instructions for executing a control method of an image processing apparatus, the computer readable medium comprising:
computer-executable instructions for performing a read process for reading a document image and creating image data;
computer-executable instructions for receiving image data from an external apparatus;
computer-executable instructions for storing the created image data or the received image data, in a storage device;
computer-executable instructions for receiving from a user an instruction for specifying image from among the image data which has been generated or received, and has been stored in the storage device; and
computer-executable instructions for retrieving an attribute value of the image data, and setting the retrieved attribute value as at least a part of read settings for a read process of another document image,
wherein a read process for reading another document image and creating another image data is performed in accordance with the read settings including the retrieved attribute value.

15. An image processing apparatus comprising:
a receiving unit configured to receive image data from an external apparatus;
a storing unit configured to store the image data received by said receiving unit;
a specifying unit configured to receive from a user an instruction for specifying image data from among the image data which has been received by the receiving unit and stored in the storing unit;
a setting unit configured to retrieve an attribute value of the image data specified by the specifying unit, and set the retrieved attribute value as at least a part of read settings for a read process of a document image; and
a reading unit configured to perform a read process for reading a document image and creating image data, in accordance with the read settings, the at least a part of which is set by said setting unit.

16. The image processing apparatus according to claim 15, further comprising:
a user setting unit configured to receive from a user an instruction for setting read settings for a read process,
wherein the read unit further performs a read process for reading a document image and creating image data, in accordance with the read settings set by said user setting unit.

* * * * *